(12) United States Patent
Ronkainen et al.

(10) Patent No.: US 10,303,340 B2
(45) Date of Patent: May 28, 2019

(54) METHOD, DEVICE AND SYSTEM FOR USER INTERFACE ADAPTATION

(75) Inventors: Sami Ronkainen, Tampere (FI); Jukka Saarinen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 168 days.

(21) Appl. No.: 14/004,521

(22) PCT Filed: Mar. 16, 2011

(86) PCT No.: PCT/FI2011/050228
§ 371 (c)(1),
(2), (4) Date: Nov. 6, 2013

(87) PCT Pub. No.: WO2012/123621
PCT Pub. Date: Sep. 20, 2012

(65) Prior Publication Data
US 2014/0157143 A1   Jun. 5, 2014

(51) Int. Cl.
G06F 3/048    (2013.01)
G06F 3/0484   (2013.01)
G06K 9/00     (2006.01)
G06K 9/22     (2006.01)

(52) U.S. Cl.
CPC ....... *G06F 3/0484* (2013.01); *G06K 9/00892* (2013.01); *G06K 9/22* (2013.01)

(58) Field of Classification Search
None
See application file for complete search history.

(56) References Cited

U.S. PATENT DOCUMENTS

| | | | |
|---|---|---|---|
| 6,912,386 B1 | 6/2005 | Himberg et al. | |
| 8,429,103 B1* | 4/2013 | Aradhye | G06N 99/005 706/12 |
| 2002/0083025 A1* | 6/2002 | Robarts | G06F 1/163 706/12 |
| 2002/0107843 A1* | 8/2002 | Biebesheimer | G06F 17/30528 |
| 2008/0036591 A1 | 2/2008 | Ray | |
| 2008/0077865 A1 | 3/2008 | Hiles et al. | |

(Continued)

OTHER PUBLICATIONS

International Search Report and Written Opinion received for corresponding Patent Cooperation Treaty Application No. PCT/FI2011/050228, dated Dec. 22, 2011, 15 pages.

(Continued)

*Primary Examiner* — William C Trapanese
(74) *Attorney, Agent, or Firm* — Alston & Bird LLP

(57) ABSTRACT

The present application relates to adapting a user interface based on context information. In the method, apparatus and system according to the present application, a context vector (920) is used to select a plurality of resource availability vectors (930, 940, 950). The plurality of resource availability vectors are indicative of availability of user resources in the corresponding context. The selected resource availability vectors are then used together in adapting a user interface (960, 970, 980) according to the availability of the user resources. There is also a method and devices for forming a data structure that can be used in the selection of the resource availability vectors. The method may select from different user interface modalities (960, 970, 980) by processing sensor input data with an associative memory, such as a sparse distributed memory.

21 Claims, 10 Drawing Sheets

(56) References Cited

U.S. PATENT DOCUMENTS

| | | | | |
|---|---|---|---|---|
| 2008/0268943 | A1* | 10/2008 | Jacob | A63F 13/10 463/23 |
| 2009/0299939 | A1 | 12/2009 | Jung et al. | |
| 2010/0161380 | A1* | 6/2010 | Song | G06Q 10/04 705/7.11 |

OTHER PUBLICATIONS

Berchtold, M. Processing sensor data with the common sense toolkit (CSTK), [online] Lancaster Ubiquitous Computing Group, Mar. 4, 2005. Retrieved from the internet <URL: http:www.teco.edu/~berch/other_docs/ProcessingSensordataWithTheCSTK.pdf>.

Denning, PJ. Sparse Distributed memory. American Scientist 77 (Jul.-Aug. 1989), pp. 333-335 [online], Retrieved from the internet: <URL:http:www.cs.gmu.edu/cne/pjd/PUBS/amsci-sdm.pdf>.

Stan Franklin—wikipedia, the free encyclopedia [online] [retrived Mar. 16, 2016]. Retrieved from the internet: <URL: http://en.wikipedia.org/wiki/Stan_Franklin>. (Feb. 12, 2016), 2 pages.

Anwar, A. et al., *Spare Distributed Memory as a Tool for Conscious Software Agents*, [online] [retrieved Mar. 21, 2016]. Retrieved from the Internet: <URL: http://ccrg.cs.memphis.edu/assets/papers/Sparse%20Distributed%20Memory%20as% . . . >. (Web Archive Database frst captured Jun. 23, 2010) 23 pages.

Bellemare, M. G. et al., *Context-Drive Predictions*, IJCAI-07 (2007) 25-255.

Crowley, J. L. et al.,*Perceptual Components for Context Aware Computing*, UBICOMP 2002, International Conference on Ubiquitous Computing, Goteborg, Sweden (Sep. 2002) 18 pages.

Flanagan, J. A. et al., *Unsupervised Clustering of Symbol Strings and Context Recognition*, Proc $2^{nd}$ IEEE International Conference on Data Mining ICDM 2002 (2002) 171-178.

Franklin, S., *A "Consiousness"-Based Architecture for a Functioning Mind*, Chapter 9, A "Consciousness"- Based Architecture, Idea Group, Inc. (2005) 181-207.

Franklin, S., *Modeling Consciousness and Cognition in Software Agents*, Proceedings of the International Conference on Cognitive Modeling (Mar. 2000) 11 pages.

Jokel, S., *Crossmodal Learning and Prediction of Autobiographical Episodic Experiences Using a Sparse Distributed Memory*, Doctoral Thesis, University of Hamburg (Nov. 2009) 228 pages.

Obrenovic, Z/ et al., *Universal Accessibility as a Multimodal Design Issue*, Communications of the ACM 50(5) (2007) 9 pages.

Rogers, D., *Kanerva's Sparse Distributed Memory: An Associative Memory Algorithm Well-Suited to the Connection Machine*, Research Institute for Advanced Computer Science, RIACS Technical Report 88.32 (Nov. 1988) 21 pages.

Ronkainen, S., *Designed Ultra-Mobile Interaction Experiences and Method*, PhD Thesis, publication C355, Faculty of Technology, Department of Electrical and Information Engineering, University of Oulu (May 2010) 110 pages.

Sears, A. et al., *Physical Disabilities and Computing Technologies: An Analysis of Impairments*, In: Jacko JA & Sears A (eds) Human-Computer Interaction Handbook: Fundamentals, Evolving Technologies and Emerging Applications, Chap 42 (2003) 829-852.

* cited by examiner

METHOD, DEVICE AND SYSTEM FOR USER INTERFACE ADAPTATION

RELATED APPLICATION

This application was originally filed as PCT Application No. PCT/FI2011/050228 filed Mar. 16, 2011.

BACKGROUND

The development of computers into hand-held and mobile devices has led to a situation where these devices are used in many different environments and situations, that is, in different contexts. This brings about new challenges for arranging the operation of the devices. For example, the user of the device may be in a place, where it is difficult to use some features of the device. Consequently, one application area for context-aware computing has been adapting the user interface of the device according to the context.

However, there is a vast number of different contexts that may be relevant to the task of adapting the user interface. Furthermore, it may sometimes be difficult to adapt the user interface even though the context is known—it may not be known, what the user can or cannot do in such a context.

There is, therefore, a need for a solution that makes it easier and more reliable to adapt a user interface based on context.

SUMMARY

Now there has been invented an improved method and technical equipment implementing the method, by which the above problems are alleviated. Various aspects of the invention include a method, an apparatus, a server, a client and a computer readable medium comprising a computer program stored therein, which are characterized by what is stated in the independent claims. Various embodiments of the invention are disclosed in the dependent claims.

The different example embodiments relate to adapting a user interface based on context information. In the method, device and system according to the example embodiments, a context vector is used to select a plurality of resource availability vectors. The plurality of resource availability vectors are indicative of availability of user resources in the corresponding context. The selected resource availability vectors are then used together in adapting a user interface according to the availability of the user resources. Examples of user resources are e.g. the ability to use hands to operate a device, and the ability to use the eyes to perceive the output from a device. There is also a method and devices for forming a data structure that can be used in the selection of the resource availability vectors.

According to the example embodiments, the individual elements defining the context are understood as a context vector. For example, matters like speed, acceleration, lighting, audible noise level and temperature may be such elements of the context. These elements are used directly to select a plurality of resource availability vectors, possibly without the need of determining the actual context from the context elements. This means that there are a number of different results for the same context vector. These results define the different aspects of the availability of user resources associated with the context vector. In other words, there are a plurality of—possibly different—availability results associated with the context vector for an individual user resource. These results are then used together to determine how the user interface is adapted.

According to a first aspect, there is provided a method comprising providing a data structure comprising context vectors and resource availability vectors and having an association between said context vectors and said resource availability vectors, receiving a context vector, using said context vector to select a plurality of resource availability vectors, the plurality of resource availability vectors being indicative of availability of user resources, and modifying the selected resource availability vectors using a teaching resource availability vector associated with said context vector.

According to an embodiment, the method comprises modifying said selected resource availability vectors by increasing the value of the elements corresponding to an available resource in said teaching resource availability vector. According to an embodiment, the method comprises modifying said selected resource availability vectors by decreasing the value of the elements corresponding to an unavailable resource in said teaching resource availability vector. According to an embodiment, the method comprises using a distance measure in said selecting, and modifying said selected resource availability vectors according to said distance measure. According to an embodiment, the method comprises thresholding said teaching resource availability vector, and modifying said selected resource availability vectors using said thresholded teaching resource availability vector.

According to a second aspect, there is provided a method comprising receiving a context vector, using said context vector to select a plurality of resource availability vectors, the plurality of resource availability vectors being indicative of availability of user resources, and using said selected resource availability vectors together in adapting a user interface according to the availability of said user resources.

Embodiments of the previous aspects will be described next. According to an embodiment, the resource availability vectors reside in an associative memory such as a sparse distributed memory, and the method comprises inputting said context vector as a single memory address input to said associative memory, and selecting a plurality of data vectors from the associative memory based on said input address. According to an embodiment, the method comprises choosing said associative memory among a group of associative memories based on said received context vector, and selecting said plurality of data vectors in said selected associative memory using said context vector. According to an embodiment, the resource availability vectors have an associated context address, and the method comprises carrying out said selection by comparing said context vector to said context addresses. According to an embodiment, the possible address space of context addresses comprises more entries than the total number of context addresses associated to availability vectors, and the addresses of the memory locations having been assigned to the resource availability vectors using a function. According to an embodiment, the function is a random function. According to an embodiment, the function corresponds to a statistical distribution of context vectors. According to an embodiment, the method comprises carrying out the selection comprises forming a distance measure between said received context vector and another vector. According to an embodiment, calculating said distance measure comprises forming a Hamming distance. According to an embodiment, calculating said distance measure comprises forming a dot product. According to an embodiment, the method comprises said context vector is indicative of an environmental variable such as temperature, time, location, altitude, acceleration, attitude, lighting, noise conditions and humidity. According to an embodiment, said context vector is indicative of the state of the device such as an operating profile, availability of a keyboard, availability of a touch input device and power supply conditions. According to an embodiment, said context vector is indicative of the state of a software application. According to an embodiment, said resource availability vectors having been formed by selecting former resource availability vectors as in the first aspect and the method comprises modifying the selected resource availability vectors using a teaching resource availability vector associated with said context vector. According to an embodiment, the method comprises forming an adaptation vector from said selected resource availability vectors. According to an embodiment, forming said adaptation vector comprises summing said resource availability vectors. According to an embodiment, forming said adaptation vector comprises forming bit representations of available resources. According to an embodiment, forming said adaptation vector comprises determining a certainty of a resource availability. According to an embodiment, the method comprises determining said certainty using the magnitude of the corresponding elements of the resource availability vectors. According to an embodiment, the method comprises forming said adaptation vector comprises summing said resource availability vectors to obtain a sum vector, and determining said certainty comprises using the magnitude of the sum vector. According to an embodiment, the method comprises repeating the selecting step iteratively by using results from a previous iteration in said context vector. According to an embodiment, said user resources comprising at least one of the group of ability to watch, ability to operate manually, ability to speak, ability for a system to receive speech input, ability to hear or listen, ability to feel, social restrictions and cognitive restrictions. According to an embodiment, said adapting comprises adapting at least one of the group of visual output, auditory output, speech output, speech recognition, tactile output, touch input and key input.

According to a third aspect, there is provided a data structure comprising context vectors and resource availability vectors and an association between said context vectors and said resource availability vectors, said data structure being suitable for obtaining control data for controlling an operation of a device by using an input context vector to select a plurality of resource availability vectors from said data structure, the plurality of resource availability vectors being indicative of availability of user resources, and controlling operation of a device using said selected resource availability vectors together to adapt a user interface of the device according to the availability of said user resources. According to an embodiment, the data structure has elements suitable for use with any of the embodiments of the other aspects, e.g. the first and the second aspect.

According to a fourth aspect, there is provided a computer-readable memory comprising the data structure of the third aspect.

According to a fifth aspect, there is provided a device comprising a processor, memory, computer program code in said memory and a data structure according to the third aspect in said memory, and an adaptable user interface arranged to be adapted by said computer program code according to any embodiment of the first and the second aspect when said computer program code is run on said processor.

According to a sixth aspect, there is provided a device comprising means for processing information, means for storing information, means for interacting with the user, means for carrying out a method according to any embodiment of the second aspect for adapting said interaction with the user.

According to a seventh aspect, there is provided an apparatus comprising at least one processor, memory, a user interface and computer program code in said memory, said computer program code being configured to, with the at least one processor, cause the device at least to receive a context vector, use said context vector to select a plurality of resource availability vectors, the plurality of resource availability vectors being indicative of availability of user resources, use said selected resource availability vectors together in adapting said user interface according to the availability of said user resources.

According to an embodiment, the apparatus comprises an associative memory such as a sparse distributed memory, resource availability vectors residing in said associative memory, and computer program code configured to cause the apparatus at least to input said context vector as a single memory address input to said associative memory, and select a plurality of data vectors from the memory base on said input address. According to an embodiment, the apparatus comprises means for producing said context vector. According to an embodiment, the apparatus comprises different user interface modalities, and means for enabling and disabling said user interface modalities based on said availability of user resources.

According to an eighth aspect, there is provided a system, comprising at least one user apparatus, network server, said network server providing a user interface to said at least one user apparatus, said system comprising means for forming a context vector, means for using said context vector to select a plurality of resource availability vectors, the plurality of resource availability vectors being indicative of availability of user resources, and means for using said selected resource availability vectors together in adapting said user interface according to the availability of said user resources.

According to an embodiment, the system comprises means for carrying out the method according to any embodiment of the first and the second aspect. According to an embodiment, said forming of the context vector is carried out at the user apparatus. According to an embodiment, said selecting of the resource availability vectors is carried out at the user apparatus. According to an embodiment, said selecting of the resource availability vectors is carried out at a network server. According to an embodiment, said adapting of said user interface is carried out at the user apparatus. According to an embodiment, said adapting of said user interface is carried out at the server. According to an embodiment, the system is a network service system for providing a network service to a user of the user apparatus via a web browser.

According to a ninth aspect, there is provided a computer program product stored on a non-transitory computer readable medium and executable in a data processing apparatus, the computer program product comprising computer program code sections for carrying out the method steps according to any embodiment of the first and the second aspect.

According to a tenth aspect, there is provided a computer program product stored on a non-transitory computer readable medium and executable in a data processing apparatus, the computer program product comprising a computer program code section for providing a data structure comprising context vectors and resource availability vectors and having an association between said context vectors and said resource availability vectors, a computer program code section for receiving a context vector, a computer program code section for using said context vector to select a plurality of resource availability vectors, the plurality of resource availability vectors being indicative of availability of user resources, and a computer program code section for modifying the selected resource availability vectors using a teaching resource availability vector associated with said context vector.

According to an eleventh aspect, there is provided a computer program product stored on a non-transitory computer readable medium and executable in a data processing apparatus, the computer program product comprising a computer program code section for receiving a context vector, a computer program code section for using said context vector to select a plurality of resource availability vectors, the plurality of resource availability vectors being indicative of availability of user resources, and a computer program code section for using said selected resource availability vectors together in adapting a user interface according to the availability of said user resources.

DESCRIPTION OF THE DRAWINGS

In the following, various embodiments of the invention will be described in more detail with reference to the appended drawings, in which.

DESCRIPTION OF THE EXAMPLE EMBODIMENTS

In the following, several embodiments of the invention will be described in the context of adapting a user interface of a mobile device. It is to be noted, however, that the invention is not limited to mobile devices only. In fact, the different embodiments may have applications widely in any environment where optimization user interfaces is required.

Figures 1A, 1B:
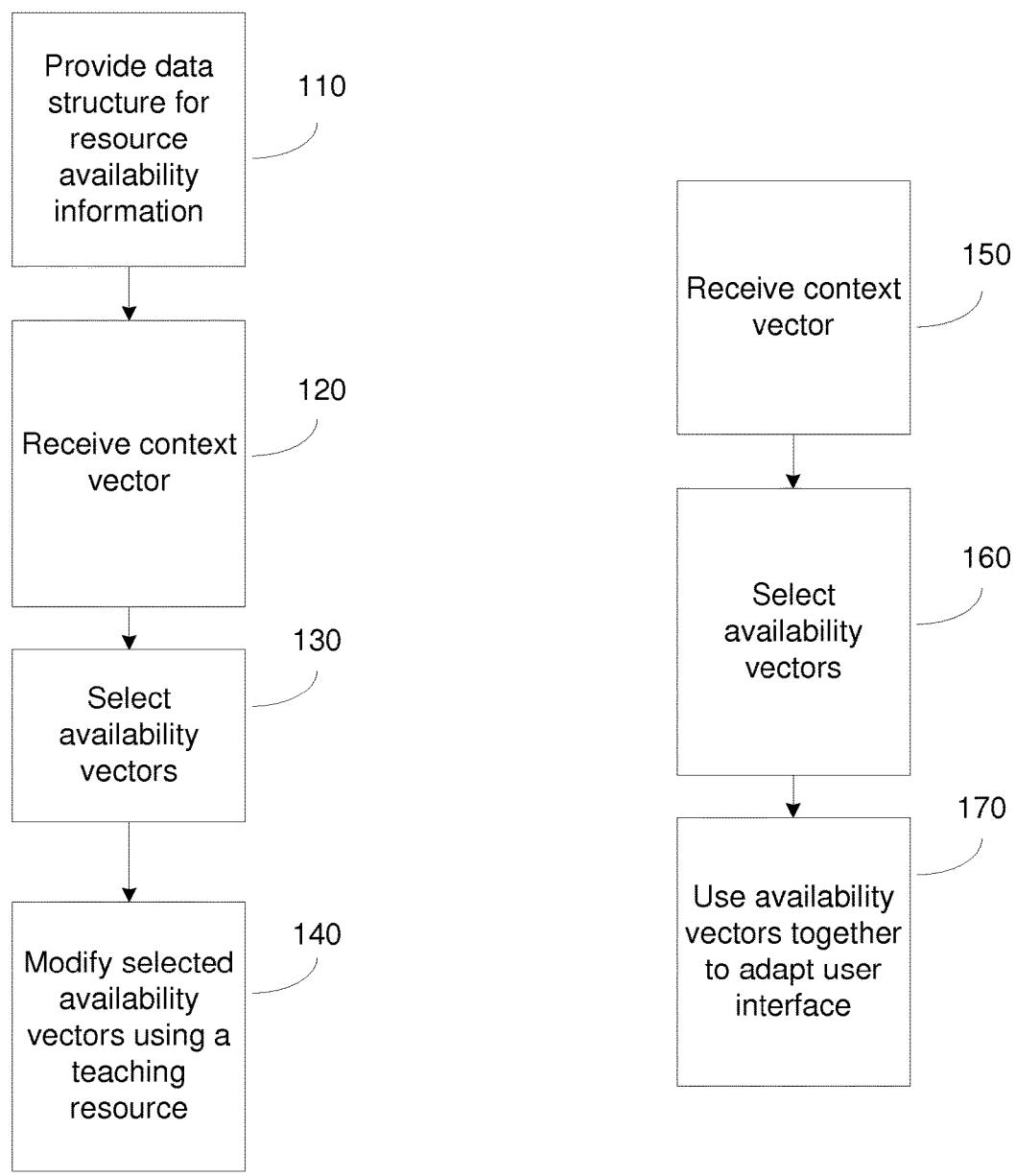
FIGS. 1a and 1b show methods for adapting a user interface and for forming a data structure for the same purpose according to an example embodiment.

FIGS. 1a and 1b show methods for adapting a user interface and for forming a data structure for the same purpose according to an example embodiment. In the methods according to an example embodiment, context data such as sensor readings and other information on the context of the user are used to adapt the user interface of a mobile device the user is using. The adapting is carried out by determining availability of user resources based on the context vector.

When the user is e.g. hurrying to catch a bus, his/her cognitive abilities, manual capabilities and vision are restricted because of the primary task of running to the bus. In a similar manner, when driving, the user's hands and eyes are mostly reserved for driving. Context awareness may be used to adapt the device to these situations. If the system detects that the user is driving then it can adapt its user interface, for instance by automatically invoking speech recognition when a call comes in.

It may be possible to recognize a context, and then adapt the user interface based on what the user's restrictions are in the recognized context. It has been noticed in the present invention that a problem of this approach may be that once the context is recognized (e.g. "driving" or "sitting at home watching TV"), the system may have difficulty to decide how the system should react to the context. An underlying problem may be that simply by knowing what the context is, it may still be known what restricts the user's ability to operate devices and how. However, the abovementioned concepts are based on the system recognizing one context out of a limited number of pre-defined ones. The number of pre-trained contexts in the system are selected by the system developers and there may be a risk that a user of a device enters an unknown context, and the system classifies the context incorrectly. As a result, the UI may be adapted in a wrong manner, causing disturbance to the user rather than helping him.

The example embodiment comprises a system that associates a number of context variables such as sensor readings representing the properties of the user's context (but not trying to classify the situation into one of a number of predefined contexts), and associating the context variables with a known (or trained) set of capabilities of the user in the situation. This may be done by creating a Sparse Distributed Memory (SDM) as computing architecture. Other associative memory models may also be used, such as those based on self-organizing maps or learning vector quantization. The direct association of the context or sensor variables to user resource availability data may help to solve the aforementioned problems that have been identified here. By creating this direct association e.g. by training/teaching the system with training data on user resource availabilities, it may not be necessary to recognize the context as such (e.g. "driving", "in the dark"), but instead the available user resources may be directly determined by using the association.

In FIG. 1a, an example method for forming a data structure and data suitable for use in the adapting of the user interface is shown. In phase 110, the underlying data structure is provided e.g. on a computer-readable medium such as a volatile or non-volatile memory, hard disc, USB memory or over the network. The data structure may have addressable locations for storing user resource availability vectors, and possibly addresses corresponding to the resource availability vectors. The data structure may be a so-called sparse distributed memory (SDM) or another type of an associative memory. Such a memory may be suitably initialized.

In phase 120, a context vector is received. The context vector may comprise e.g. bit representations of context variables such as environment variables, information on the state of the system or states of applications on the system. The context vector may be a comparatively long vector, e.g. 500, 1000, 2000 or more bits long. The length of the context vector may depend on the size of the addressable user resource availability memory. The context vector may be indicative of an environmental variable such as temperature, time, location, altitude, acceleration, attitude, lighting, noise conditions and humidity. The context vector may also be indicative of the state of the device such as an operating profile, availability of a keyboard, availability of a touch input device and power supply conditions. The context vector may also be indicative of a state of an application on the system. The context vector may also comprise earlier (history) data of the context, e.g. sampled with the sampling rate of 1 s, 1 minute or 1 hour, and concatenated with the current context vector.

In phase 130, the context vector or one or more parts of it may be used to select a plurality of user resource availability vectors. This may be achieved by comparing the context vector and the addresses of the user resource availability vectors. The user availability vectors whose corresponding address is sufficiently close to the context vector may then be selected. For example, a Hamming distance between the context vector and the addresses may be used for carrying out the selection. Alternatively, a dot-product based distance measure may be used.

In phase 140, the selected user resource availability vectors may be modified in order to train the data structure to output a matching user resource availability vector when a context vector is presented to the data structure. The training may happen e.g. so that a training or teaching resource availability vector is used, and the user resource availability vectors in the data structure are modified as indicated by the training vector. For example, the elements of the user resource availability vectors that correspond to those elements in the training vector indicating availability may be incremented. Similarly, the elements of the user resource availability vectors that correspond to those elements in the training vector indicating unavailability may be decremented.

In FIG. 1*b*, an example method for using a data structure and data in adapting a user interface is shown. In phase 150, a context vector is received. The context vector may comprise e.g. bit representations of context variables such as environment variables, information on the state of the system or states of applications on the system. The context vector may be a comparatively long vector, e.g. 500, 1000, 2000 or more bits long. The length of the context vector may depend on the size of the addressable user resource availability memory. The context vector may be indicative of an environmental variable such as temperature, time, location, altitude, acceleration, attitude, lighting, noise conditions and humidity. The context vector may also be indicative of the state of the device such as an operating profile, availability of a keyboard, availability of a touch input device and power supply conditions. The context vector may also be indicative of a state of an application on the system. The context vector may also comprise earlier (history) data of the context, e.g. sampled with the sampling rate of 1 s, 1 minute or 1 hour, and concatenated with the current context vector.

In phase 160, the context vector or one or more parts of it may be used to select a plurality of user resource availability vectors. This may be achieved by comparing the context vector and the addresses of the user resource availability vectors. The user availability vectors whose corresponding address is sufficiently close to the context vector may then be selected. For example, a Hamming distance between the context vector and the addresses may be used for carrying out the selection.

In phase 170, the selected availability vectors are used together to adapt a user interface, or merely to provide information for adapting a user interface (e.g. to a remote location controlling the user interface such as a web service). The vectors may be used together e.g. by summing them. A positive element may be indicative of availability of a user resource, and a negative element may be indicative of unavailability of a user resource. An element of zero or close to zero may indicate that the availability of a user resource is not known. The availability information of the individual user resources may be used to adapt the user interface either individually or together with each other as input to the adaptation process.

Figure 2A:
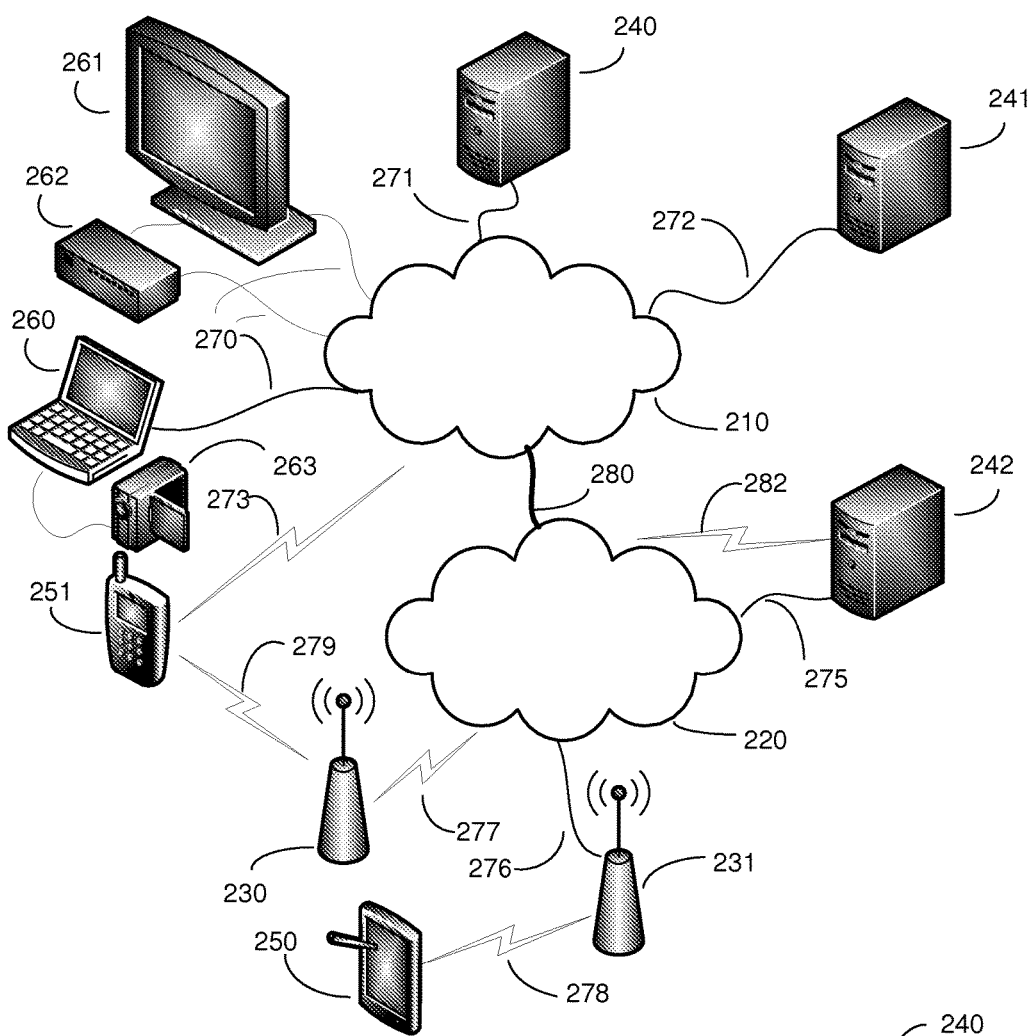
FIGS. 2a and 2b shows a system and devices for adapting a user interface.
Figure 2B:
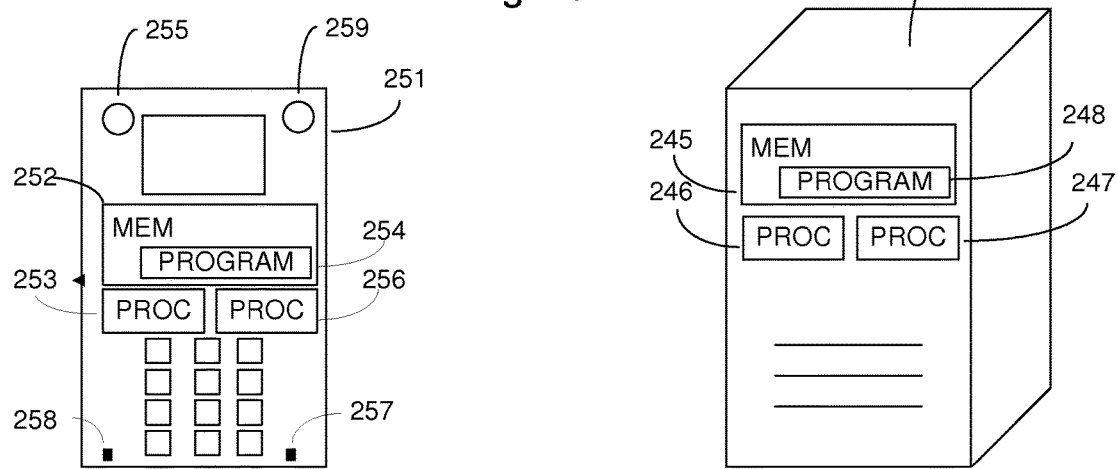

FIGS. 2*a* and 2*b* shows a system and devices for adapting a user interface according to an embodiment. In FIG. 2*a*, the different devices may be connected via a fixed network 210 such as the Internet or a local area network; or a mobile communication network 220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks are connected to each other by means of a communication interface 280. The networks comprise network elements such as routers and switches to handle data (not shown), and communication interfaces such as the base stations 230 and 231 in order for providing access for the different devices to the network, and the base stations 230, 231 are themselves connected to the mobile network 220 via a fixed connection 276 or a wireless connection 277.

There may be a number of servers connected to the network, and in the example of FIG. 2*a* are shown a server 240 for offering a network service for providing a user interface and connected to the fixed network 210, a server 241 for storing data for generating a user interface in the network and connected to the fixed network 210, and a server 242 for offering a network service for providing a user interface and connected to the mobile network 220. Some of the above devices, for example the computers 240, 241, 242 may be such that they make up the Internet with the communication elements residing in the fixed network 210.

There are also a number of end-user devices such as mobile phones and smart phones 251, Internet access devices (Internet tablets) 250, personal computers 260 of various sizes and formats, televisions and other viewing devices 261, video decoders and players 262, as well as video cameras 263 and other encoders. These devices 250, 251, 260, 261, 262 and 263 can also be made of multiple parts. The various devices may be connected to the networks 210 and 220 via communication connections such as a fixed connection 270, 271, 272 and 280 to the internet, a wireless connection 273 to the internet 210, a fixed connection 275 to the mobile network 220, and a wireless connection 278, 279 and 282 to the mobile network 220. The connections 271-282 are implemented by means of communication interfaces at the respective ends of the communication connection.

FIG. 2*b* shows devices for forming and displaying (as well as adapting) a user interface according to an example embodiment. As shown in FIG. 2*b*, the server 240 contains memory 245, one or more processors 246, 247, and computer program code 248 residing in the memory 245 for implementing, for example, an application user interface. The different servers 241, 242 may contain at least these same elements for employing functionality relevant to each server. Similarly, the end-user device 251 contains memory 252, at least one processor 253 and 256, and computer program code 254 residing in the memory 252 for implementing, for example, adaptation of the user interface. The end-user device may also have one or more cameras 255 and 259 for capturing image data, for example video. The end-user device may also contain one, two or more microphones 257 and 258 for capturing sound. The different end-user devices 250, 260 may contain at least these same elements for employing functionality relevant to each device. The end user devices may also comprise a screen for viewing a graphical user interface.

It needs to be understood that different embodiments allow different parts to be carried out in different elements. For example, forming and presenting a user interface may be carried out entirely in one user device like 250, 251 or 260, or in one server device 240, 241, or 242, or across multiple user devices 250, 251, 260 or across multiple network devices 240, 241, 242, or across both user devices 250, 251, 260 and network devices 240, 241, 242. For example, the data for creating the user interface may be stored in one device, the forming of the user interface elements may happen in another device and the input and output functionalities of the user interface may be carried out in a third device. The user interface elements may be implemented as a software component residing on one device or distributed across several devices, as mentioned above, for example so that the devices form a so-called cloud.

The different embodiments may be implemented as software running on mobile devices and optionally on services. The mobile phones may be equipped at least with a memory, processor, display, keypad, motion detector hardware, and communication means such as 2G, 3G, WLAN, or other. The different devices may have hardware like a touch screen (single-touch or multi-touch) and means for positioning like network positioning or a global positioning system (GPS) module. There may be various applications on the devices such as a calendar application, a contacts application, a map application, a messaging application, a browser application, a gallery application, a video player application and various other applications for office and/or private use. The devices may have various sensors e.g. detecting the temperature, humidity, lighting conditions, ambient sound conditions, altitude, acceleration and speed, as well as location, attitude and others.

Figure 3:
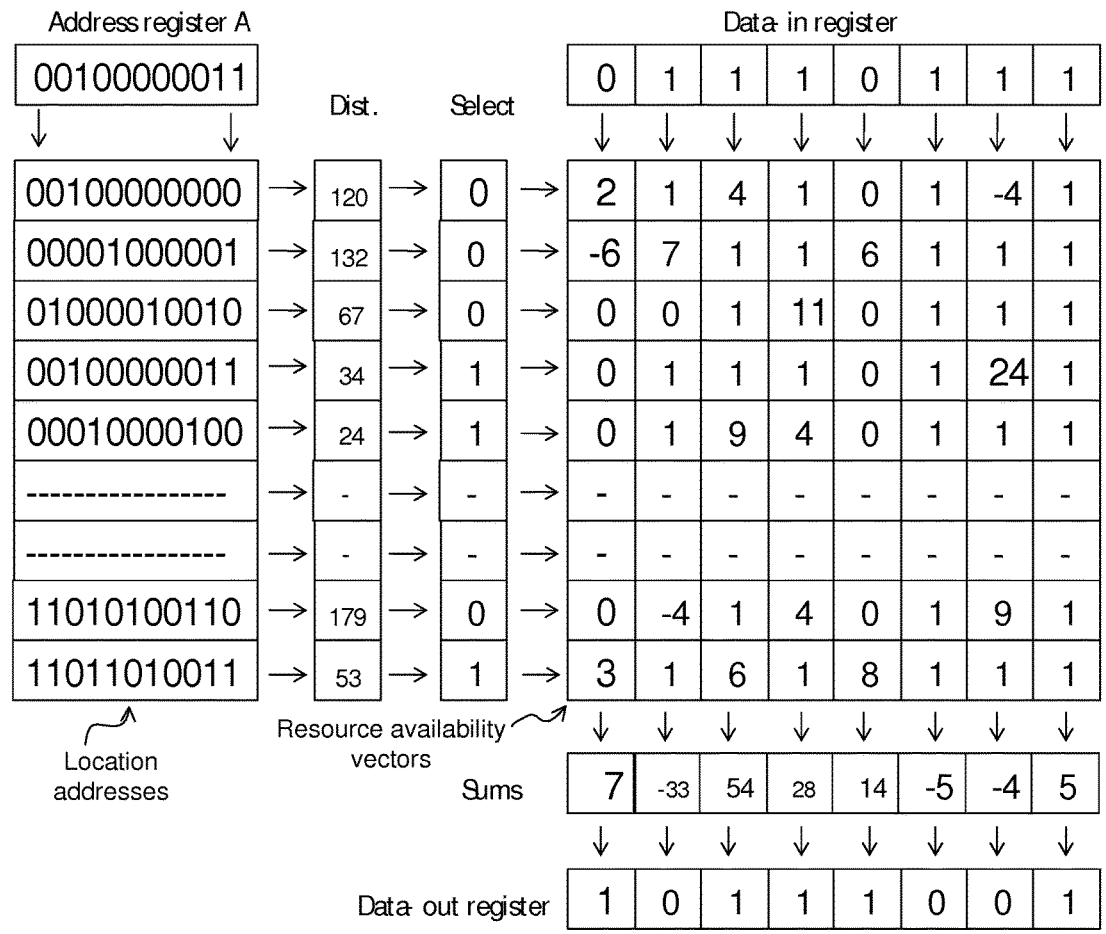
FIG. 3 shows an organization of a memory for storing resource availability information according to an example embodiment.

FIG. 3 shows an organization of a memory for storing resource availability information according to an example embodiment. In the example embodiment, a type of an associative memory called a Sparse Distributed Memory (SDM) is used as the data structure for storing user resource availability information. The SDM architecture may encompass a suitable number of physical locations (e.g. 1,000,000) and a large address pattern size (e.g. 1,000 bits). Each location may be assigned an address (a 1,000-bit pattern) using a function, e.g. at random, and the set of location addresses constitutes a sparse subset of the memory space. The memory may have an input register for the cue (address) pattern and an input register for the data pattern (for training), and it may have a register for an output pattern (these registers may hold e.g. 1,000 bits or another number, similar or dissimilar to each other). The memory may comprise a large number of resource availability vectors in the locations corresponding to the location addresses.

The function used to assign the locations their addresses may be a random function. Alternatively, or in addition, the addresses may be assigned with a function that is dependent on the statistical distribution of the input context vectors. For example, there may be more addresses close to the addresses where input vectors are dense, and in areas where there are no input vectors, there may be also fewer addresses assigned in the memory.

The input and/or output vectors may be variable in size. This may be implemented so that there are zero-padding bits at the end or at a certain location in the vector, and when new input or output data is taken into use, some or all of the zero-padding bits are used for this purpose. In this way, the data content inside a vector may grow. The vector may also grow or diminish in length so that new bits are added to the vector at a given location, e.g. at the end. If the size of the vector changes, the size of the location addresses and/or the size of the resource availability vectors may be changed correspondingly. The zero-padding, i.e. reserving space for new data in advance, may be advantageous in a dynamic system where e.g. new applications may be installed on the system with new user interface elements, or in a situation where new context data is taken into use. For example, the data corresponding to the new context may be added to the context vector, and the resource availability vectors may be trained for the new context data.

It may be feasible to use masks with the input or output vectors. The masks may indicate "don't care" variables and/or bits that e.g. will not be used in the address comparison. Selective training may be implemented with the help of masks, as well, since the user resource availability training vector may be concentrated on those user resources that a certain context has an impact on.

In addition to, or instead of masks, an input context vector or an input resource availability vector may be subjected to a mapping through a memory model of its own prior to sending it to the main memory model. In this way, the input vector may be cleared of noise or otherwise modified before it is used. Examples of such modification may be found in FIGS. 6*a*, 6*b* and 6*c*.

Each location may have an address decoder that compares its own address with the input cue (in the figure, the pattern "00100000011"), selecting that location as a participant in the next storage or retrieval operation whenever the cue is within a specified distance d (e.g. "less than 60" in the figure) of the location's address. In FIG. 3, the 4th 5th and the last location have been selected to participate as indicated by "1" in "select" column.

The context vector and the addresses may be encoded such that a distance measure works well in determining their similarity. For example, a temperature between −15 and 35 degrees centigrade may be coded with 11 bits. A temperature of 5 degrees more would add one "1" to the bit string, for example so that −5 degrees would be represented by the string "11100000000", the temperature of +10 degrees would be represented by "11111100000" and 30 degrees by "11111111110". Other representations are of course possible, too. such representations may concentrate on describing the pattern of the input data, e.g. by spectral components or such.

As an example, approximately $\frac{1}{1000}$ of the physical locations may be selected by any given input cue (address). To retrieve e.g. a 2,000-bit pattern corresponding to input cue A, the memory may work as follows. The sphere of selected locations is formed as described above. A set of 2,000 output element values is constructed from all the selected locations by summing all the corresponding selected vectors; for example, the output element value in output bit position 2 is the sum of the bit-2 vector elements (counters) of each selected physical location. The 2,000-bit output pattern may be constructed from the 2,000 output counters by a threshold method: if an output counter is nonnegative, that output bit is 1, otherwise it is 0.

The SDM model is sparse because the physical locations are a small subset of the memory space; it is distributed because a pattern is stored in many locations and retrieved by statistical reconstruction from many locations. Distribution may enable the memory to retrieve a stored pattern when the input cue only partially matches any stored pattern, an ability that may arises from the large overlap between the spheres of selected locations of two similar cues. It may also render the memory robust in case of failure of portions of the addressing or storage hardware.

These properties may make the memory more reliable for determining the user resource availability vectors corresponding to different context vectors.

The memory may be able to form associations between patterns without ever being explicitly taught those associations, because the distance between two patterns may be sufficiently small that the one pattern retrieves the other. Similarly the memory may be able to retrieve a forgotten pattern from a cue (address) that seemingly had nothing to do with it, giving the impression of generating a new pattern. It may e.g. retrieve the pattern corresponding to "maple leaves" that was formed internally after storing many patterns encoding specific maple leaves. It may appear to store patterns in lists representing their temporal order, and begin an iterative retrieval from anywhere in the list. Fast convergence of an iterative search may be interpreted as "knowing that you know" and non-convergence as "knowing that you don't know". These properties may be used to determine certainty of the output.

An SDM system and its operations compared to an ordinary contemporary computer memory may be described as follows.

An ordinary computer memory is a memory for short strings of bits, typically 8, 16, 32, or 64 bits. The bit strings are often thought of as binary numbers or "words," but, in general, they are just small patterns of bits. The memory stores them in addressable locations. The addresses to the memory also are short strings of bits. For example, 20 bits will address a memory with approximately one million locations.

A sparse distributed memory is likewise a memory for strings of bits, except that the strings may be hundreds or thousands of bits long. Because the strings are so long, they are best thought of as large patterns. The addresses to the memory are also long strings of bits, or large patterns.

The behavior of an ordinary computer memory can be described as follows: If the word W has been written with address A, then W can be read back by addressing the memory with A, and we say that A points to W. The condition for this is, of course, that no other word has been written with address A in the meantime (overwriting W).

A sparse distributed memory may have the following behavior: If the pattern W has been written with pattern A as the address, then W can be read back by addressing the memory with A, and we say that A points to W. However; the conditions for this may be more different than they are with ordinary computer memories, namely, that no other pattern has been written before or since with address A or with an address that is similar to A.

This difference may pay off in noise tolerance in two ways: To read the pattern W from a sparse distributed memory, the address pattern may not need to be exactly A (in ordinary computer memory, the exact address A must be used to read W). This means that the SDM memory may be able to tolerate noisy reference address; it may be able to respond to a partial or incomplete cue. Tolerance for noisy data shows up as follows: If many noisy versions of the same target pattern have been written into the memory, a (nearly) noiseless target pattern may be possible to be read back.

There may be one associative (e.g. SDM) memory structure for operating in all conditions. Alternatively, there may be two, three or more at least partly different memory structures one of which may be selected according to a criterion. For example, there may be one data structure for work use, another for private use, and a third for travel use. There may also be a plurality of data structures that compete with each other and the one that delivers the most reliable result may be used. The reliability may be determined from the values of the selected user resource availability vectors and/or their sum vector.

Figure 4A:
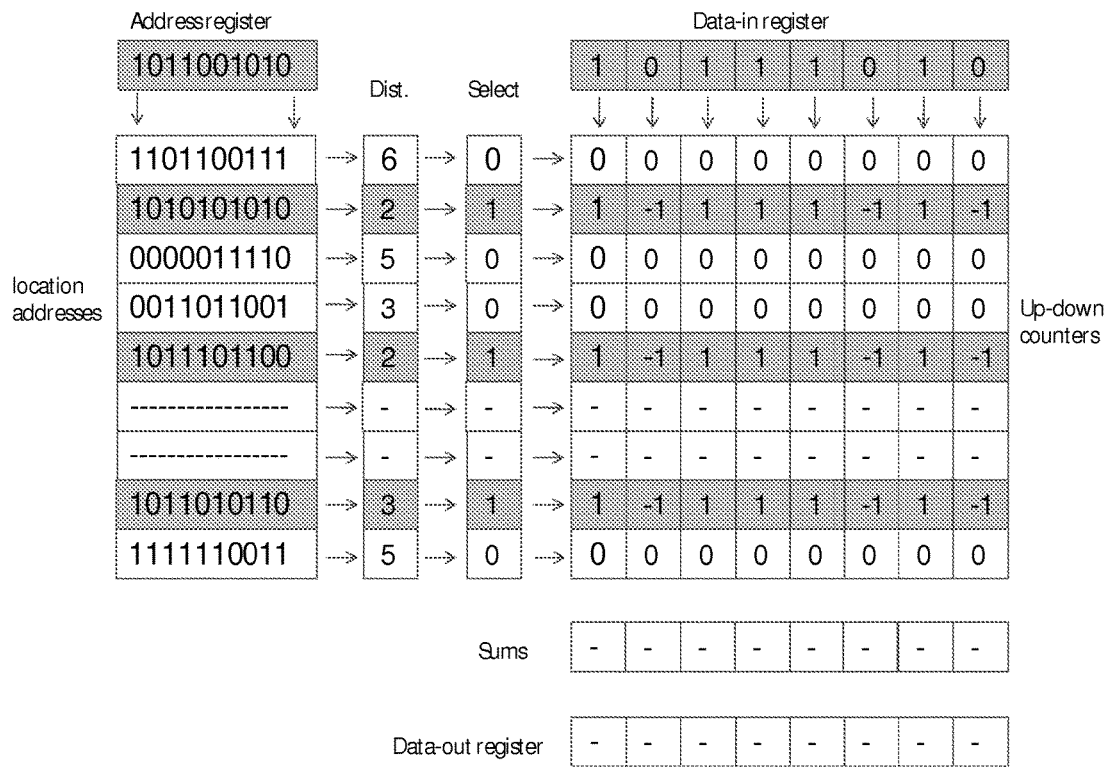
FIGS. 4a and 4b illustrate how resource availability information may be written into a memory according to an example embodiment.
Figure 4B:
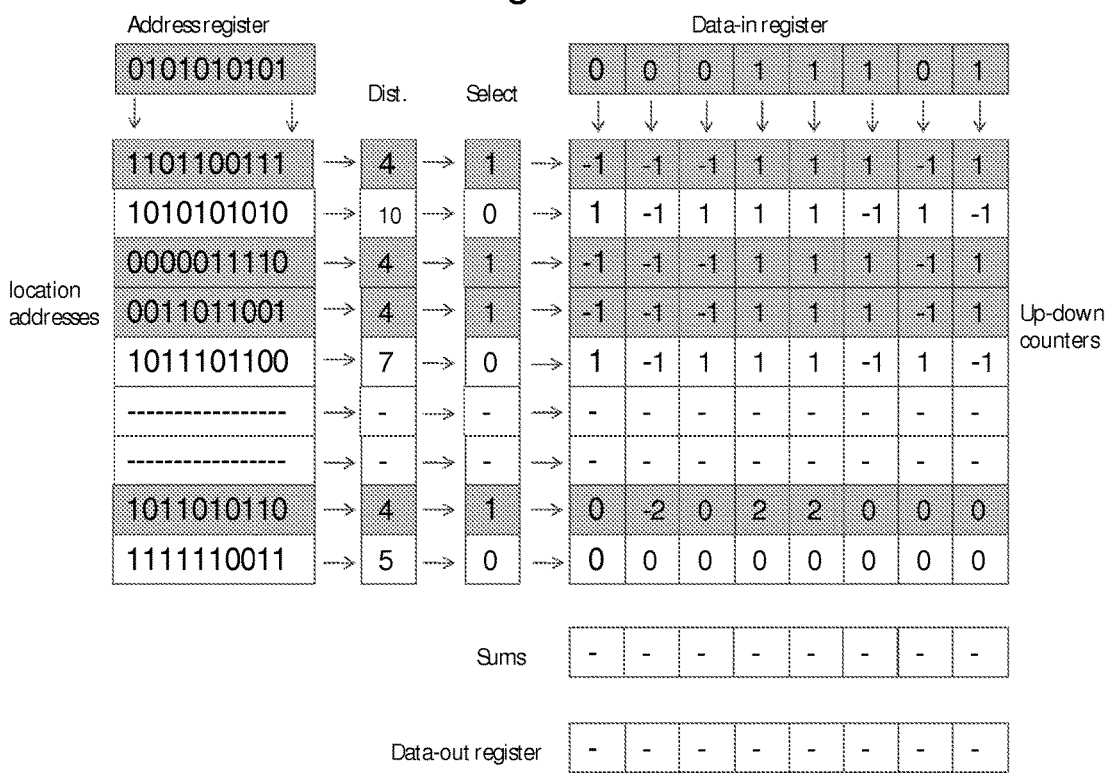

FIGS. 4a and 4b illustrate how resource availability information may be written into a memory according to an example embodiment. To store a 2,000-bit data pattern at address A, the memory may work as follows. The input cue pattern A (in the figure, the pattern "1011001010") is presented to the memory, and all locations within a certain Hamming distance from A select themselves (in FIG. 4a, the $2^{nd}$, the $5^{th}$ and the previous to the last location have been selected). This set of selected locations is called the sphere selected by A. A copy of the input data pattern (in the figure, the pattern "10111010"), which is to be associated with A, is then entered into each of the selected locations. Because any given location is within the spheres of selection of many distinct cue patterns, entering a new value may be arranged not to obliterate the previous contents of the location. This may be accomplished e.g. by implementing each location as a set of 2,000 counters, one for each bit position of the data. Data are entered by adding 1 to each counter for which the corresponding data bit is 1, and subtracting 1 from each counter for which the corresponding data bit is 0.8-bit or 16-bit counters may be adequate for most applications.

A (data) pattern is written from the data-in register into the memory e.g. by adding it into all selected locations (in an ordinary computer memory, new data would replace old data in one location). The data may be added simply by incrementing the counters under the ones of the data-in register and by decrementing the counters under the zeros. The modification of the memory vectors may be done also so that it is dependent on the distance formed in the selection phase e.g. so that locations having a smaller distance are modified more than locations having a larger distance. A neighborhood function may be used for determining the amount of modification.

FIG. 4b shows the writing of a second pattern into the same memory as in FIG. 4a. Corresponding to the incoming context vector (address) of "0101010101", the $1^{st}$, $3^{rd}$, $4^{th}$ and the previous to the last location have been selected. The corresponding elements based on the input teaching pattern "00011101" are incremented and decremented, as before. As more and more data are written into the memory, individual counters may reach their capacity. When this happens, attempts to increment a counter past its maximum value or to decrement it past its minimum value are ignored.

The system may be trained for user interface adaptation by arranging a number of training situations, covering many different contexts. The current capabilities of the user (or e.g. in practice, a number of test users) may be measured continuously during training. This may be done by self-observation (a test user classifies the situation e.g. as "easy", "semi-difficult" or "demanding" with respect to every resource we are interested in, e.g. "manual use", "voice input", "vision", . . . ). The training may also be done by measuring the user's capabilities. This may be done by arranging a number of performance tests. For instance, the user is requested to react whenever a certain sound is played (among a number of other sounds), and the reaction time and correctness is interpreted as a number describing the user's capability of using his hearing in the situation. In a similar manner, tests can be arranged for measuring various other capabilities as well. e.g. vision, touch and feel and so on.

It may be, in general, difficult to obtain some user resource availability values directly by measurements, e.g. it may be difficult to determine directly how socially demanding a situation is. In such a case, the user resource availability vectors may be determined by evaluation by a group of test users during training, and the values (e.g. low/medium/high) may be used for training the system. For capabilities more clearly having to do with the user's sensomotoric and cognitive abilities in the context (e.g. manual dexterity) may be measured by having a test user or even the actual user of a device perform some test tasks in the studied environment, and measuring the user's performance. The measurement may be done e.g. by comparing to at least one different context. The comparison result may be expressed as percentages, in relation to a situation that is considered not demanding, i.e. where all capabilities are maximally available. The percentages indicate the user resource availabilities in the studied context.

When the user's capabilities to use each of his resources are given numeric values as described above, these may be associated with the current sensor readings. Hence, later on (during use), a user may simply carry his device, and the system may create an association between current sensor readings and the user's probable capabilities of using each of his resources for operating a device.

Figure 5A:
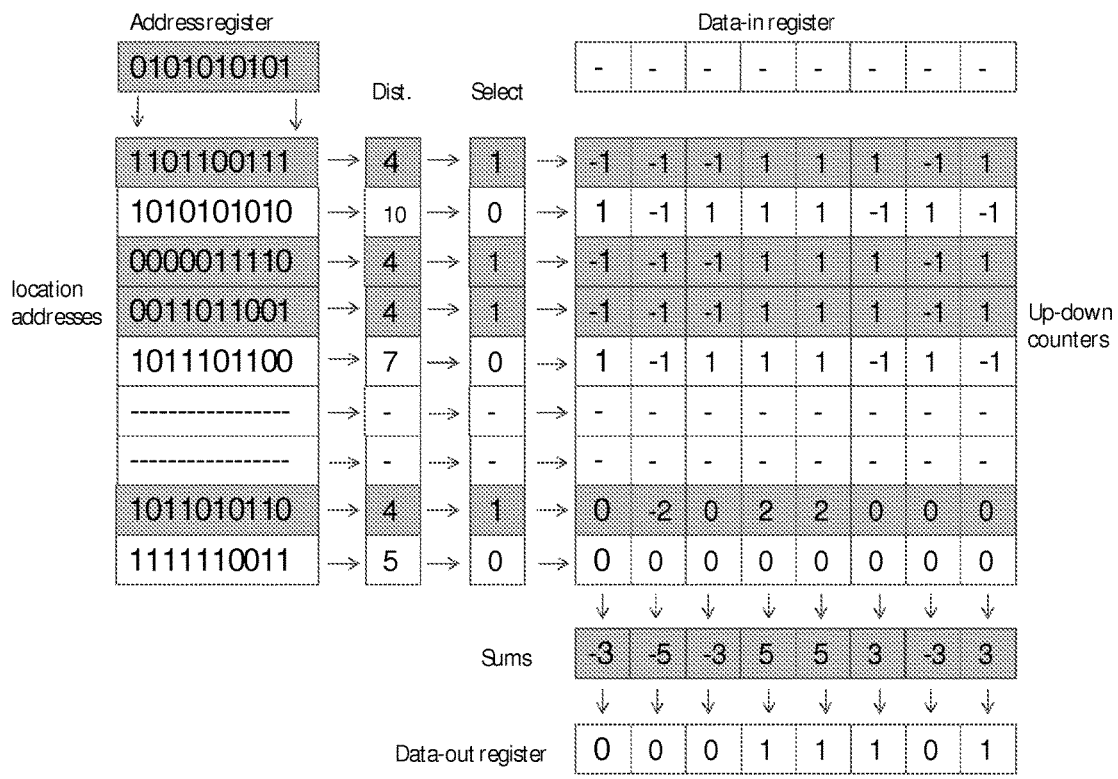
FIGS. 5a and 5b show how resource availability patterns may be determined using a memory according to the invention.
Figure 5B:
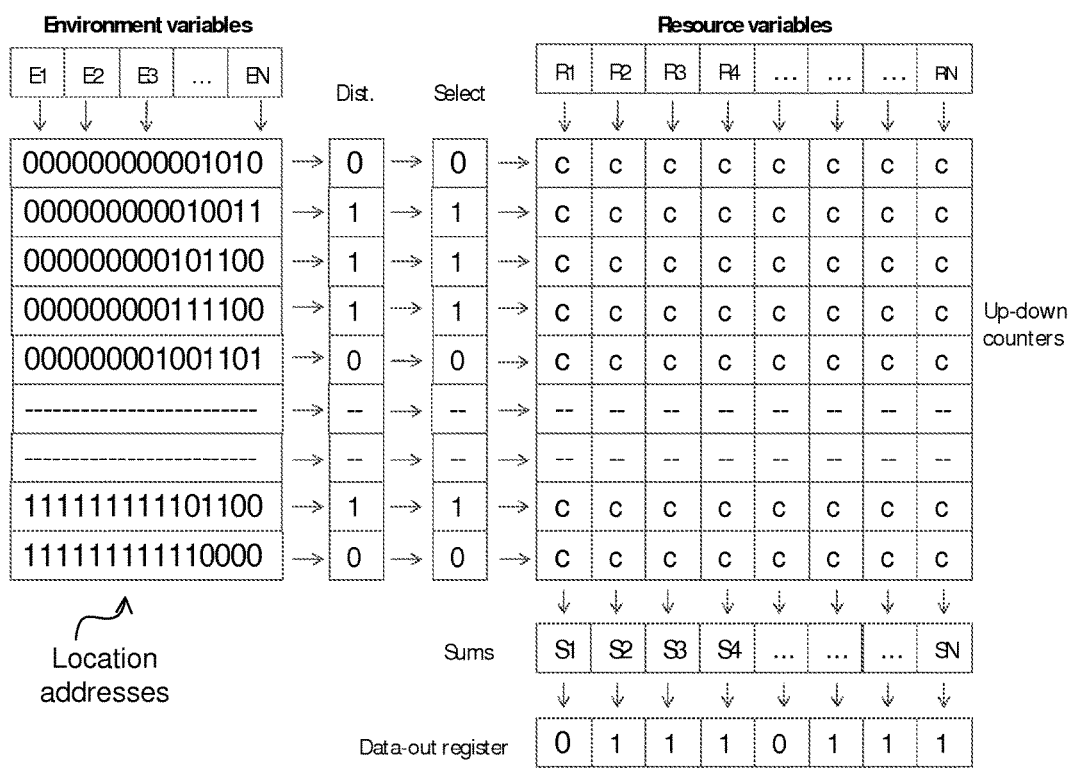

FIGS. 5a and 5b show how resource availability patterns may be determined using a memory according to the invention.

An ordinary computer memory is an array of addressable registers or memory locations. The locations are numbered sequentially, and the sequence number is the location's address. A memory with a thousand locations will therefore need ten-bit addresses. If the memory is built for eight-bit words, each location will have eight one-bit storage bins or flip-flops.

A sparse distributed memory may also be implemented as an array of addressable registers or memory locations. The addresses of the locations, however, are not sequence numbers but large bit patterns (e.g. 256-bit addresses). To store 1024-bit data patterns, each location may have 1024 storage bins for small up-down counters. This organization is shown in FIG. 3. Because the memory addresses are large bit patterns, the number of addresses and hence of possible memory locations is very high. Only memories with a small subset of the possible locations may be built in practice, and that is why these memories are called sparse. Practical numbers may range in the thousands to millions to billions of locations.

To move data into and out of the memory array, both kinds of memories may have three special (input/output) registers: one for the memory address or cue, another for the word or data pattern to be written into the memory, and the third for the word or data pattern being read out of the memory.

In addition to the memory array and the input and output registers, FIGS. 3 and 5a show intermediate results of a memory operation. The numbers in the column or columns between the address matrix ("location addresses" on the left) and the contents matrix ("resource availability vectors or up-down counters on the right) indicate whether a memory location is selected for a given read or write operation. The selection depends on the contents of the address register (the context vector), on the location's address, and on the selection criterion. FIGS. 3 and 5a have, in addition, a row of sums as a way of getting from the contents of the memory locations to the final output pattern.

Reading and writing in an ordinary computer memory is simple in concept. Both operations start with specifying a memory address in the address register. That selects one location from the memory array—the location with the matching address. If the memory operation is a write, the word being written is placed in the data-in register, and it will replace the word stored previously in the selected location: if it is a read, the contents of the selected location are copied into the data-out register.

Reading and writing in a sparse distributed memory likewise start with addressing the memory. However, when an address is specified in the memory-address register, the memory array will usually not have a location with that exact address. This is overcome by selecting many locations at once—and by modifying the rules for writing and reading accordingly.

The criterion for selecting or activating a location may be similarity of address patterns: If the location's address is sufficiently similar to the address in the address register, the location is selected. A Hamming distance between address patterns may provide a measure of similarity. The column next to the address matrix in FIG. 5a shows these Hamming distances, and the column next to it has ones where this distance does not exceed the agreed maximum distance. These than are the selected (nearby, active) locations, the unselected (distant, inactive) locations being indicated by zeros in the select column. As a rule of thumb, the selection criterion should be such that many locations are active at once, but their number should not exceed a certain portion, e.g. the square root of the total number of memory locations.

A pattern is read out of the memory (from the selected locations) e.g. by computing an average over the contents of the selected locations. A simple average is gotten by adding the contents (vector addition) and by thresholding the sums at zero, with a sum larger than zero yielding a 1 in the output pattern, and a sum smaller than or equal to zero yielding a 0. A bit of the output pattern will then be 1 if, and only if, the patterns written into the currently active locations in the training phase have more ones than zeros in that bit position, constituting a bitwise majority rule.

A property of the sparse distributed memory is sensitivity to similarity, or noise tolerance. It is the result of distributing the data, that is, of writing into and reading from many locations at once, and it may be explained mathematically by the amount of overlap, counted in active memory locations, when the memory is addressed with two different patterns. If two address patterns are very similar to each other, the sets of locations they activate have many locations in common; if they are dissimilar, the common locations are few or none.

The example illustrates that, in a sparse distributed memory, common address bits translate into common memory locations, and common memory locations translate into weights for stored patterns when reading from the memory. Thus, the memory is a means of realizing a weighting function that gives low weights to most of the patterns written into the memory and high weights only to a small number of "relevant" patterns, the relevance being judged by similarity of address.

The operation of the memory may be understood to be statistical, and the actual output may be affected not only by the construction of the memory but also by the structure of the data. The results discussed above may be demonstrated e.g. when the addresses of the locations and the data are a uniform random sample of their respective spaces of bit strings. There may be a further condition than not too many patterns have been written into the memory. The memory may work in the manner described if the number of stored patterns is e.g. less than 1-5 percent of the number of memory locations.

The memory's ability to store associations, and pattern sequences in particular, may give the memory and the data structure a capability to predict, and the failure of a prediction may signal an occasion for learning. Learning may be carried out by training through a set of examples rather than by explicit programming. This is referred to as learning from experience. The term is particularly appropriate if the training patterns encode real-world phenomena.

In FIG. 5b, the input address vector is a context vector comprising environment variables E1, ..., EN. The environment variables may be represented by one or more bits each. The mapping from the environment variable value to the context vector bit pattern may be such that it can be used with the distance measure of the selection criterion in the SDM. The user resource availability variables R1, ..., RN may also be formed into a bit string so that these variables may be used in training. The sums S1, ..., SN may be converted to a bit pattern, where one or more bits indicate the availability of a user resource. This information may be used for adapting the user interface. The sums S1, ..., SN may also be used directly for adapting the user interface.

The magnitude of the elements S1, ..., SN may be indicative of the certainty of the user resource availability. Large magnitudes may indicate a high certainty of availability or unavailability of a user resource, and a small magnitude may indicate a low certainty. For example, only availability values with a high enough certainty may be used, while those with low certainty may be ignored for the adapting of the user interface. This may prevent erroneous adaptation even in the case where the context of the user is a completely new one.

The user may choose to train or teach such new situations to the memory. For example, when an output of a low certainty is encountered, and the user indicates that the system should learn a new context, the user may tell the system which of his resources (speech, audio, visual, touch etc.) are available, or the system may detect the availability of the resources automatically. In addition or alternatively, the system may learn how the user adapts the user interface manually and deduct the user resource availabilities from the manual adaptation.

The use of an SDM model as the data structure may allow a highly multidimensional context space to be associated with a highly multidimensional user resource space. Since the computational operations may be implemented to be operable in parallel, this may provide an increase in speed compared to traditional ways of adapting a user interface.

There may be one associative (e.g. SDM) memory structure for operating in all conditions. Alternatively, there may be two, three or more at least partly different memory structures one of which may be selected according to a criterion. For example, there may be one data structure for work use, another for private use, and a third for travel use. There may also be a plurality of data structures that compete with each other and the one that delivers the most reliable result may be used. The reliability may be determined from the values of the selected user resource availability vectors and/or their sum vector.

Figure 6A:
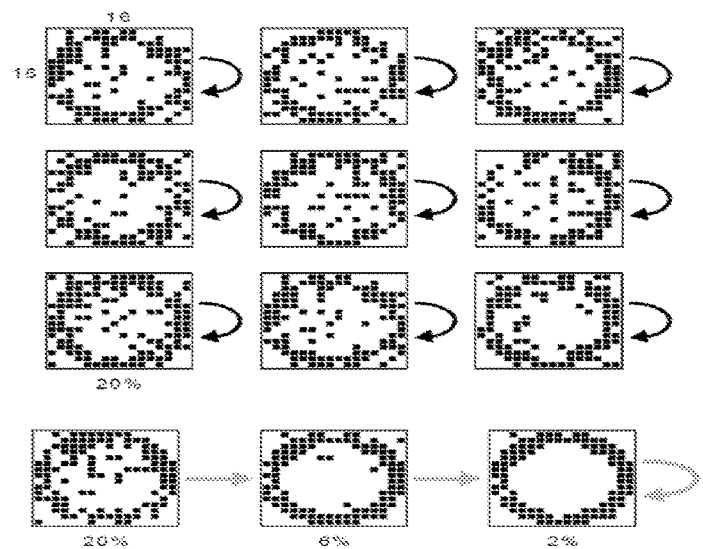
FIGS. 6a, 6b and 6c illustrate iterative reading of a pattern of information from a memory according to an example embodiment.
Figure 6B:
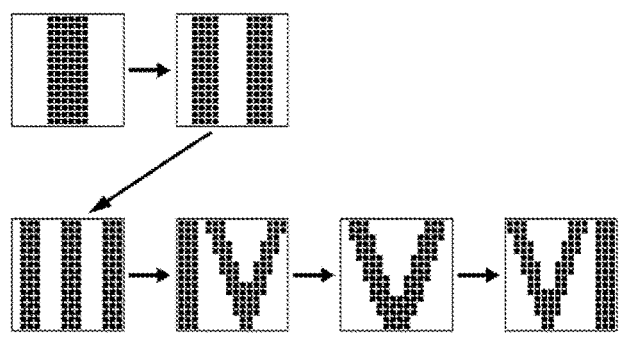
Figure 6C:
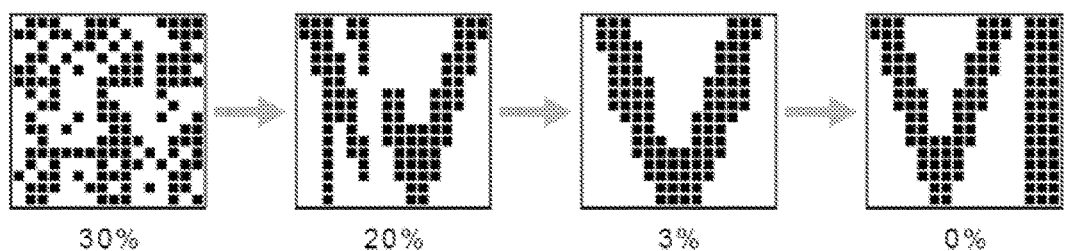

FIGS. 6a, 6b and 6c illustrate iterative reading of a pattern of information from a memory according to an example embodiment.

FIG. 6a illustrates the SDM memory's tolerance for noise in an experiment carried out in an example embodiment. This memory works with 256-bit patterns, and it is autoassociative in type. For ease of comparing patterns with each other, the patterns are displayed on a 16×16 grid with 1-bits shown in black. The nine patterns in the upper part of the figure were obtained by taking a circular pattern and changing 20 percent of the bits at random. Each of the patterns was written into the memory with itself as the address (that is, the address and data lengths of the memory are both 256 bits). The noisy tenth pattern was then used as the address for reading from the memory, and the relatively noise-free eleventh pattern was retrieved. When that pattern was used as the next read address, the final, nearly noise-free pattern was retrieved. Worth special notice is that the noise-free circular pattern was never used as the write address nor was it ever written into the memory (i.e., the memory had never "seen" the ideal pattern; it created it from the noisy versions it had seen).

The method of storage in which each pattern is written into memory with itself as the address, as illustrated in FIG. 6a, is called autoassociative. With autoassociative storage, the memory behaves like a content-addressable memory in the following sense: It allows a stored pattern to be retrieved if enough of its components are known. A more general method of storage in which an address pattern and the associated data pattern are different is called heteroassociative.

FIG. 6b illustrates the use of SDM in storing a sequence of patterns. The sequence is stored as a pointer chain, with the first pattern pointing to the second, the second to the third, and so forth. Any pattern in the sequence can then be used to read out the rest of the sequence simply by following the pointer chain. Furthermore, the cue for retrieving the sequence may be noisy, as shown in FIG. 6c, in which a noisy third pattern retrieves a less noisy fourth, which in turn retrieves an almost noiseless fifth pattern, and the sixth pattern retrieved is perfect. If the memory's address and data patterns are of different size, only heteroassociative storage is possible, although it is not possible to store pattern sequences as pointer chains.

The term 'associative memory' may refers to the general property of linking one pattern to another, or forming an association, the linkage being the association. However, the term may also be understood to be more specific as 'content-addressable memory'. The term "associative memory" may also be understood to imply also noise tolerance (of the input address) as illustrated in the examples above.

Figure 7:
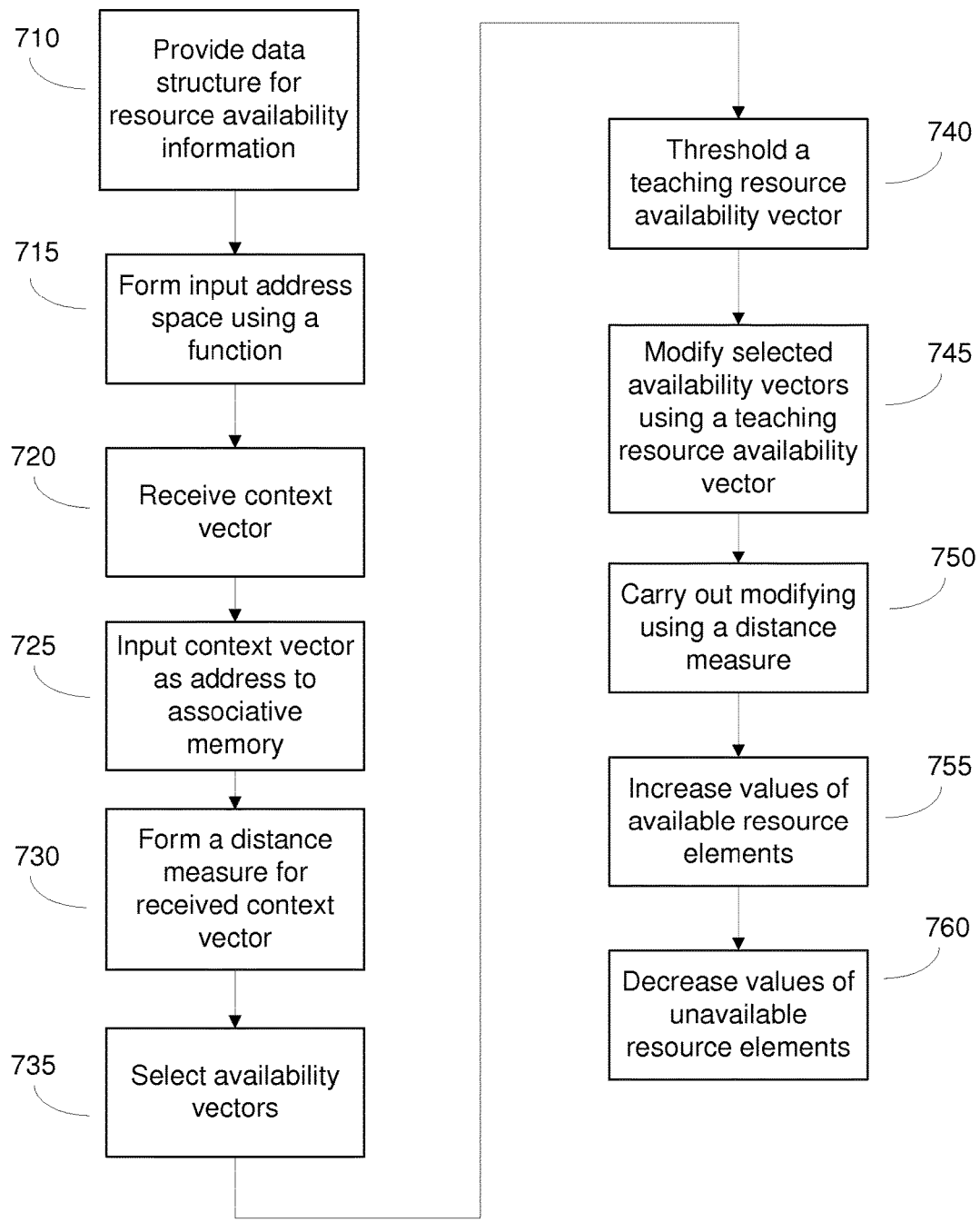
FIG. 7 shows a method for creating a data structure into a memory according to an example embodiment.

FIG. 7 shows a method for creating a data structure into a memory according to an example embodiment. In phase 710, the underlying data structure may be provided e.g. on a computer-readable medium such as a volatile or non-volatile memory, hard disc, USB memory or over the network. The data structure may have addressable locations for storing user resource availability vectors, and possibly addresses corresponding to the resource availability vectors. The data structure may be a so-called sparse distributed memory (SDM) or another type of an associative memory. Such a memory may be suitably initialized.

In phase 715, the input address space may be formed. The forming of the input address space may be done completely in random, or there may be a function used in the forming of the input addresses. The function used to assign the locations their addresses may be a random function, that is, at least part of the function may be based on a random number generator. Alternatively, or in addition, the addresses may be assigned with a function that is dependent on the statistical distribution of the input context vectors. For example, there may be more addresses close to the addresses where input vectors are dense, and in areas where there are no input vectors, there may be also fewer addresses assigned in the memory.

In phase 720, a context vector is received. The context vector may comprise e.g. bit representations of context variables such as environment variables, information on the state of the system or states of applications on the system. The context vector may be a comparatively long vector, e.g. 500, 1000, 2000 or more bits long. The length of the context vector may depend on the size of the addressable user resource availability memory. The context vector may be indicative of an environmental variable such as temperature, time, location, altitude, acceleration, attitude, lighting, noise conditions and humidity. The context vector may also be indicative of the state of the device such as an operating profile, availability of a keyboard, availability of a touch input device and power supply conditions. The context vector may also be indicative of a state of an application on the system. The context vector may also comprise earlier (history) data of the context, e.g. sampled with the sampling rate of 1 s, 1 minute or 1 hour, and concatenated with the current context vector.

In phase 725, the received context vector may be input to an associative memory such as a sparse distributed memory as an address. Before input, the context vector may be masked with a mask, or it may be refined by using e.g. an autoassociative sparse distributed memory. In phase 730, a distance measure between the input context vector and the addresses may be formed. This may be carried out in parallel, e.g. so that each memory location carries out its own distance calculation. Alternatively, the comparison may happen wholly or partly sequentially.

In phase 735, the context vector or one or more parts of it may be used to select a plurality of user resource availability vectors. This may be achieved by comparing the context vector and the addresses of the user resource availability vectors. The user availability vectors whose corresponding address is sufficiently close to the context vector may then be selected. For example, a Hamming distance between the context vector and the addresses may be used for carrying out the selection. Alternatively, a dot-product based distance measure may be used.

In phase 740, a teaching vector (describing available user resources for the current context) may be processed e.g. by thresholding or by other means. The teaching vector may have been formed e.g. by information received from the user or measured from the user behavior or performance. The teaching vector may also be processed by an autoassociative sparse distributed memory.

In phase 745, the selected user resource availability vectors may be modified in order to train the data structure to output a matching user resource availability vector when a context vector is presented to the data structure. The training may happen e.g. so that a training or teaching resource availability vector is used, and the user resource availability vectors in the data structure are modified as indicated by the training vector. In phase 750, the modification may be boosted or the modification may happen already in phase 745 so that the distance is used as a basis for modifying the vectors: the smaller the distance, the larger the modification.

In phase 755, or already in earlier phases 745 and 750, the elements of the user resource availability vectors that correspond to those elements in the training vector indicating availability may be incremented. Similarly, in phase 760, or already in earlier phases 745 and 750, the elements of the user resource availability vectors that correspond to those elements in the training vector indicating unavailability may be decremented.

The modification of the user resource availability vectors in the data structure may be carried out during use, that is, the data structure may be updated e.g. when the system detects that the output resource availability data may not be reliable. As described, this may be detected from the values of the sum vector being close to zero. In such a case, the system may also request from user or measure information on user resource availability to determine the input teaching vector.

Figure 8:
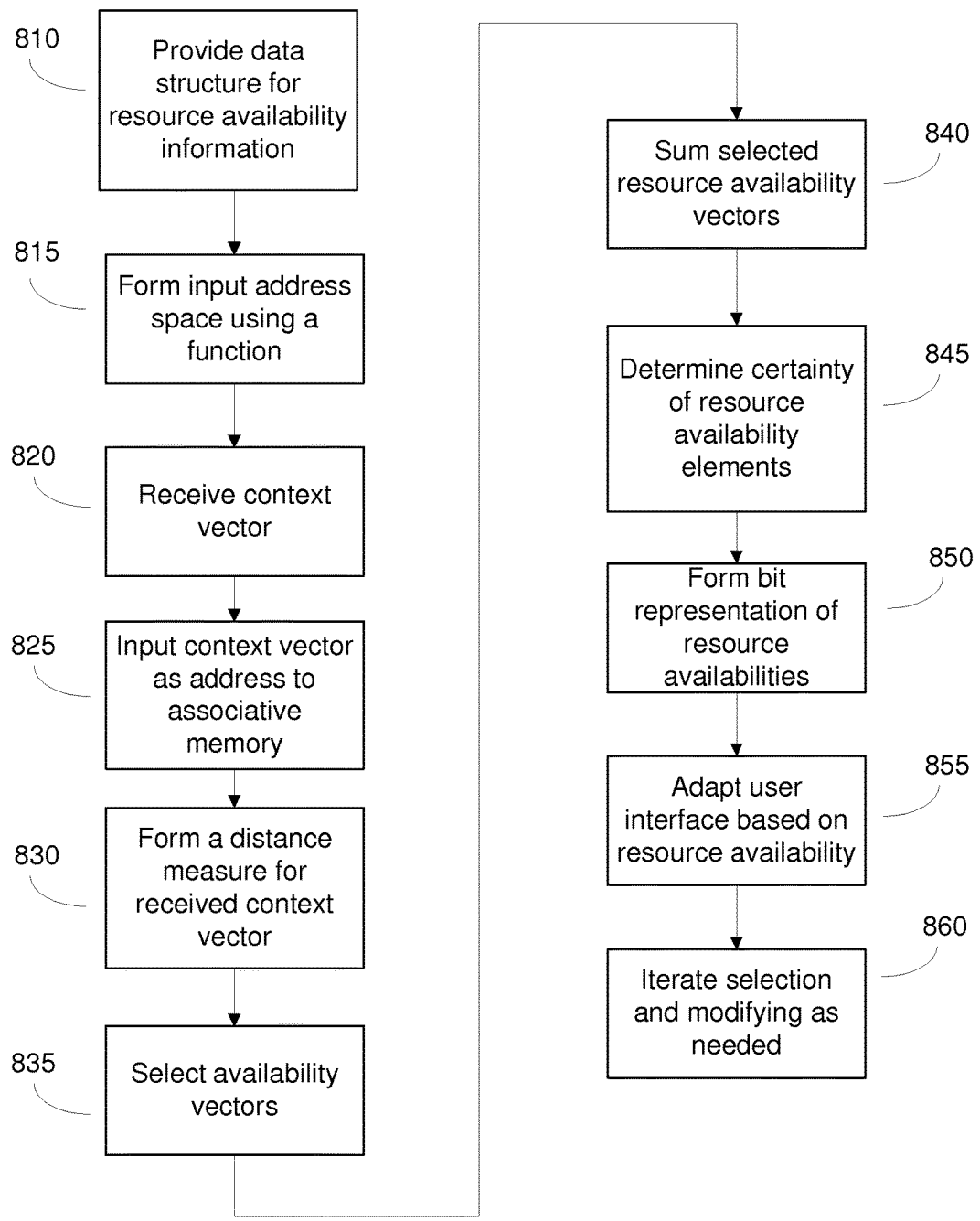
FIG. 8 shows a method for determining resource availability using a context vector according to an example embodiment.

FIG. 8 shows a method for determining resource availability using a context vector according to an example embodiment. In phase 810, the underlying data structure may be provided e.g. on a computer-readable medium such as a volatile or non-volatile memory, hard disc, USB memory or over the network. The data structure may have addressable locations for storing user resource availability vectors, and possibly addresses corresponding to the resource availability vectors. The data structure may be a so-called sparse distributed memory (SDM) or another type of an associative memory. Such a memory may be suitably initialized, e.g. by loading data onto it that is suitable for determining user resource availabilities as described earlier.

In phase 815, the input address space may be formed, possibly together and synchronized with phase 810. That is, addresses for the memory locations may be loaded or determined. The forming of the input address space may be done completely in random, or there may be a function used in the forming of the input addresses. The function used to assign the locations their addresses may be a random function, that is, at least part of the function may be based on a random number generator. Alternatively, or in addition, the addresses may be assigned with a function that is dependent on the statistical distribution of the input context vectors. For example, there may be more addresses close to the addresses where input vectors are dense, and in areas where there are no input vectors, there may be also fewer addresses assigned in the memory. The assignment may also be completely deterministic e.g. based on a pseudo-random function that produces the same addresses over and over again when applied to a memory address space of the same characteristics. This may avoid the need of storing the memory addresses, since they may be generated upon loading the data into the memory.

In phase 820, a context vector is received. The context vector may comprise e.g. bit representations of context variables such as environment variables, information on the state of the system or states of applications on the system. The context vector may be a comparatively long vector, e.g. 500, 1000, 2000 or more bits long. The length of the context vector may depend on the size of the addressable user resource availability memory. The context vector may be indicative of an environmental variable such as temperature, time, location, altitude, acceleration, attitude, lighting, noise conditions and humidity. The context vector may also be indicative of the state of the device such as an operating profile, availability of a keyboard, availability of a touch input device and power supply conditions. The context vector may also be indicative of a state of an application on the system. The context vector may also comprise earlier (history) data of the context, e.g. sampled with the sampling rate of 1 s, 1 minute or 1 hour, and concatenated with the current context vector.

In phase 825, the received context vector may be input to an associative memory such as a sparse distributed memory as an address. Before input, the context vector may be masked with a mask, or it may be refined by using e.g. an autoassociative sparse distributed memory. In phase 830, a distance measure between the input context vector and the addresses may be formed. This may be carried out in parallel, e.g. so that each memory location carries out its own distance calculation. Alternatively, the comparison may happen wholly or partly sequentially.

In phase 835, the context vector or one or more parts of it may be used to select a plurality of user resource availability vectors. This may be achieved by comparing the context vector and the addresses of the user resource availability vectors. The user availability vectors whose corresponding address is sufficiently close to the context vector may then be selected. For example, a Hamming distance between the context vector and the addresses may be used for carrying out the selection. Alternatively, a dot-product based distance measure may be used.

In phase 840, the sum or other combination (e.g. a sum weighted by the distances from the input context vector, or an average) of the selected resource availability vectors may be formed. A positive element of a resource availability vector may be indicative of availability of a user resource, and a negative element may be indicative of unavailability of a user resource. An element of zero or close to zero may indicate that the availability of a user resource is not known. The information on the magnitude of the resource availability vector elements may thus be used in phase 845 to form certainty information on the availability of a user resource.

In phase 850, a representation from the combination of the vectors may be formed, e.g. as a bit representation or as quantified representation. Positive numbers may be converted to a bit having a value "1" and zero or negative value to a bit having a value of "0". Alternatively, a range of values, e.g. a range of −1024 to 1023 may be quantified to a two-bit representation having the values of "00", "01", "10" and "11", describing the degree of availability of the user resource. Some of the resource information may also be masked out, e.g. based on the certainty information.

In phase 855, the selected availability vectors may be used together to adapt a user interface, or merely to provide information for adapting a user interface (e.g. to a remote location controlling the user interface such as a web service). The vectors may be used together e.g. by summing them, as described above. The availability information of the individual user resources may be used to adapt the user interface either individually or together with each other as input to the adaptation process.

The selection and modifying the user interface may be iterated as needed in phase 860.

An SDM memory and data structure may be used as a system for mapping of environment variables to human-like resource variables, as has been described earlier. Next, the environment and resource spaces are described more detail.

An environment variable may be understood to be anything that can be measured or logged in an environment. Examples of environment variables are the level of illumination, or the level and spectrum of background noises. The environment variables define an n-dimensional environment space, where n is the number of variables. The number of variables can be very high. It may be understood that the context space may comprises the environment space, variables that describe the state of the system and possibly the state of applications on the system.

A single environment or context can be presented as a single point or as a cloud of points, depending on how much variation there is within environment variables in the environment, in the environment space. Contexts have been defined as clusters in the space of context variables. During later use, the device may measure a set of context variables, and compare those to values related to different clusters. Context variables typically describe similar characteristics as the environment variables described above, but may also cover other characteristics such as the internal state of the device, or existing infrastructure for device connectivity. However, their philosophy is the same regardless of how they are called: variables that describe the state of affairs around the user.

Context may be understood to be an information space consisting of situations, entities and their roles and relations. Entities are formed by grouping a set of observations. Observations, on the other hand, are generated by a collection of sensors, each populating their respective observable variables. In our system, these variables would be the environment/context variables.

An example of an environment or context space may presented in light of the following aspects:

The working environment (home, office, laboratory)
The working space
Noise
Dirt
Lighting
Temperature
Speed
Power sources
Proximity to information sources
Danger
Weather
Obstacles
Social environment
Cognitive distractions
Physical distractions
Sitting
Standing
Walking
Movement impaired
Visually impaired
Heterogeneity
Filling out a form
Looking for a phone number
Following a map
Functions; e.g. backlight control, font size adjustment, zoom
I/O channels; e.g. touch screen, voice command, gesture recognition, audio output, vibration However, without knowing the effects that the environment variables have on the user, it may be unclear which of the aspects of the environment are relevant. Let us consider an example of bicycling. A context recognition engine may recognize from the movement of the device that the user is riding a bicycle and the lighting conditions would allow the user to read the display. However, without knowing how much the user can look at the display because of the cycling task, we may not be able to say whether it would be better to use e.g. an auditory or a haptic display instead of a visual one. This information is provided through a resource space according to the example embodiments.

When we describe what the user's capabilities in a certain environment or context are, we define a resource space where the current environment is described with one point in the space. Each point in that space describes how the aspects of the context affect the user's capabilities. It is also important to notice that there can be several environment/context variables affecting one resource of the user, and one environment/context variable can have an effect on several resources. The number of dimensions of the resource space may depend on the number of analyzed modalities and the detail in which the availability of resources is described. The number may be associated with different input/output technologies assumed to be available when doing the final design.

The resource space may serve e.g. two purposes. On one hand, it may help to illustrate the effects the current environment has on the user. An effect on a resource can be caused by several environment variables. The resource space presents a combined effect of all the environment variables.

On the other hand, the resource space can be used also for finding environments with similar demands on the user, even though the environments causing these demands might be different at first sight. For instance, bright illumination on a tropical beach is a restriction to design and usage of a display. In a similar manner, when driving, the usage of the visual modality is restricted. By analyzing several environments, clusters in the resource space may be identified. If those exist, then there are environments with similar requirements for the user's resources, even though at first sight (when looking at the environment variables) the similarity would not be obvious. User interfaces optimized for those requirements would be useful in all the environments in the same cluster. These user interfaces may even not need to be context-aware or adaptive. If there are enough environments in the same cluster then even a static system would be widely useful. The system could be implemented e.g. in the form of an accessory to a mobile device in order to detect and identify the needs and requirements for user interfaces in different situations.

An example of a user resource space, that is, user resource availability variables, may be presented as follows:

Spoken Control
0—cannot speak (e.g. due to social restrictions) or speech recognition won't work (e.g. due to level & quality of background noise)
X—spoken dialogue possible, but may need to be interrupted, or speech recognition works but with a high error rate (i.e. lots of corrections needed)
1—can speak easily, speech recognition likely to work
Manual Control
0—cannot use hands (e.g. hands needed for other purposes such as carrying things)
X—one hand available for device use and/or manual dexterity is restricted
1—two hands freely available for device use
Visual Perception
0—cannot take a look at the device
X—can glance at the device or use peripheral vision, but not focus for longer than 1-2 seconds, and/or is difficult to read the display (e.g. due to lighting conditions)
1—can freely concentrate on looking at the device
Tactile Perception
0—cannot feel the device (e.g. located away from the body)
X—can feel the device but it is not easy to feel small patterns or details of patterns (e.g. device in trouser pocket and user is walking)
1—can feel even the smallest details of tactile feedback
Auditory Perception
0—cannot hear the device
X—can hear the device but there are noises masking some sounds, and/or it is not possible to fully concentrate on analyzing what the device sounds mean
1—can easily hear the device and distinguish between different sounds, extracting meaning
Cognitive Load
0—taxing situation; other tasks in the environment require most of the user's attention and/or other cognitive capabilities (e.g. the ability to produce language)
X—attention and other cognitive capabilities are sporadically available for device use
1—attention and other cognitive capabilities fully available for device use
Social Restrictions
0—difficult situation, inappropriate to draw any attention or to be seen using the device (e.g. important meeting)
X—semi-relaxed situation, inappropriate to draw more attention than others (e.g. coffee room)
1—relaxed situation, no social concerns (e.g. user is alone)

When creating the resource space, a mapping between the resource space and the environment/context space may be created. In practice it may be user-dependent how much a certain characteristic of the environment affects a certain resource. For instance, the effect of low illumination typically becomes stronger with age. Impairments of the user may also influence the mapping. However, the framework as such may be adjusted to take also individual differences in account. The mappings between environment and resource variables may be adjusted for individual users or user groups. The same environmental characteristics—such as illumination—may be defined to have different levels of demandingness for various resources with different users or user groups.

As mentioned, an aspect of the resource space may be that a user may have an impairment that prevents the usage of some resource permanently. The usage situation may cause temporary impairments and disabilities similar to those of people with permanent impairments. For disabled users, the demandingness of an environment with respect to the impaired resource may always be close to maximum. For example, the ability to see or watch the device in the presented environment has been defined to be around 50%. This number in the same environment would simply be shifted to 0% for a blind user. The analysis results of each environment may be treated in the same way, now coming up with a resource space that suggests solutions for blind people in the same environments.

The embodiments may provide several advantages over known methods. For example, the processing of the context information may be faster, since address comparison, selection and summing may be implemented as very efficient operations. Consequently, the system may enable the designer of a user interface to make use of adapting the user interface efficiently. The system may able to directly produce information on user resource availabilities.

Figure 9:
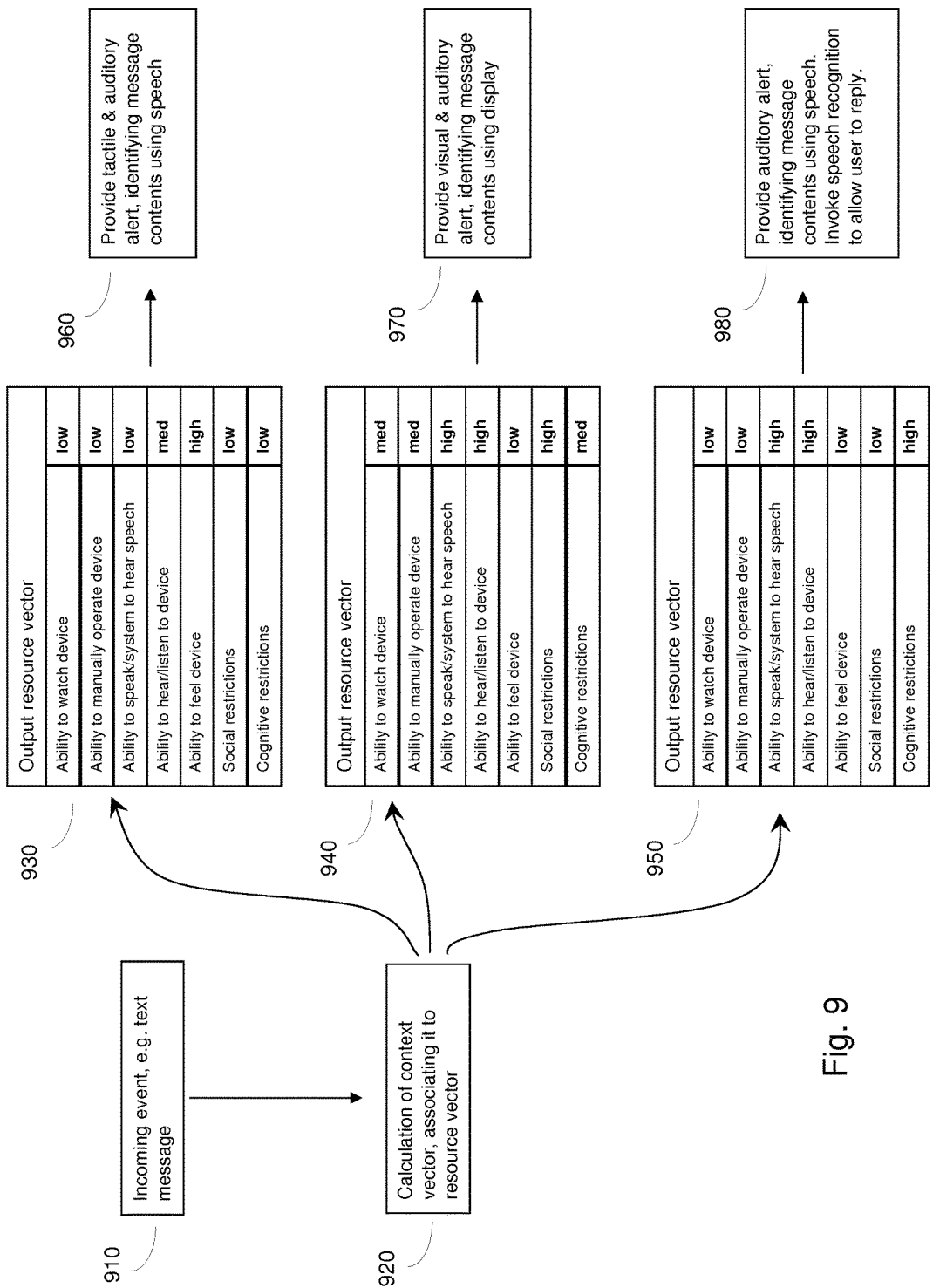
FIG. 9 illustrates adapting a user interface according to an example embodiment.

FIG. 9 illustrates adapting a user interface according to an example embodiment.

For a user interface designer, a known system that merely recognizes a context still may not produce enough information. If the system knows that the user is doing, e.g. driving, there still remains the need to analyze the driving situation, and to find out the resource limitations for the user while driving. A system described in the example embodiments may provide the advantage of removing the step of recognizing a context, and create a straightforward system for coming up with the design problem directly. Further advantage of the system may be that it may be completely unsupervised.

A user interface designer is concerned with building solutions to usability problems. For instance, when an electronic communication device receives a text message through its radio channel, the designer may seek to build a solution to present the message contents to the user in a good way, and to create means for the user to understand that he received a message and to enable the user to know how to access its contents. In a static environment (unchanging context), the problem may seem trivial—the message may be simply presented as text on a display. However, the environment may prevent the user from reading it, e.g. due to requiring visual attention to another task. If this fact (and the aspects in the environment that actually restrict the reading) is not taken into account in the user interface design, the resulting user interface may be sub-optimal for the specific environment. Furthermore, if the environment is described only in a general level, that is, the context is classified (e.g. "user is cycling"), the user interface designer may only have his or her own experience in use for visualizing in his/her mind what the problem is and how it could be solved. However, the approach described in the present application provides a clear and straightforward problem description for the user interface designer through the provided user resource availability vector: e.g. that the user cannot use his sight, but he would be able to hear the device sounds.

The associative memory techniques may allow to connect the environment variables to resource variables in a seamless way. The creation of associations is made in simple computation model without complex optimization algorithms. Very high dimensional associations (many-to-many mapping associations) may be implemented in compact way. For example, some neural networks and Hidden Markov model implementations may be more complex ways to solve this association problem, since they may be targeted to many-to-one mapping. An advantage of the many-to-many mapping capability may be that cross-dependencies between context variables and user resource availabilities may be modeled more reliably.

In practice, the user interface may be adapted as follows.

In FIG. 9, an example of adapting a user interface for a text message is shown. At 910, the system receives a text message, e.g. over a mobile communication network, or an email, or another kind of a message. The system is arrange to adapted the user interface according to the resource vector provided by the adaptation system. At 920, the system forms a context vector by using e.g. environment information, as explained earlier. In this example, there are three different contexts: In the case 930, the user could e.g. be walking with the device in his pocket. In the case 940, the user could e.g. be cycling through a fairly busy street and the phone is located in a basket on the cycle handlebar. In the case 950, the user could be driving and the device is in a car holder or on the dashboard. The different contexts restrict the user's resources in a different manner, as will be explained next.

There are three examples of different resource vectors 930, 940 and 950, related to the different environments. As can be seen in the related resource vectors, the user's capabilities (with the social & cognitive restrictions related to the environment included) vary in different situations. Hence, the system can select different courses of actions for allowing the user to react to the message—i.e. adapt its user interface.

In case 930, the system provides 960 an auditory and tactile alert, as the device can be heard and felt but not seen. Since the device is in the user's pocket, the abilities to watch the device, to manually operate the device and to operate the device by speech commands are low. The user's ability to hear the device is medium and the ability to feel the device is high. As the social demands in the context are also low, the device can automatically provide an indication of the message contents by using speech synthesis. Cognitive restrictions in this situation are also low.

In the case 940, the social restrictions are more demanding (as there may be others around and using the loudspeaker is not desirable), so the spoken output is omitted in 970. The tactile output is omitted as well, since the user wouldn't feel it, due to not being in physical contact with the device. As a result, although the user would be able to hear and speak, due to the social restrictions, the message is not read to the user by speech synthesis. Instead, since the user is able to some degree look at the screen, the message contents are provided on the display, and only an auditory alert of an incoming message is given at 970.

In the case 950, the tactile output is not used since the user cannot feel the device, and the visual output may be omitted since the user is unlikely to be able to look at the device safely. Instead, the device produces an auditory presentation at 980. Since the social demands in the situation are low (the car is a closed space), the system produces an indication of the message contents by using speech synthesis. Since the device is capable of hearing the user, and since manual input is difficult, and since the social demands are low, the system automatically invokes speech recognition to allow the user to react to the message by using speech at 980.

It is obvious that each of the described behaviors are just examples of how the system may behave. They may be decided by the user interface designer after considering what kind of UI adaptation would suit to contexts with different restrictions, or they may be chosen by the actual user of the device.

Figure 10:
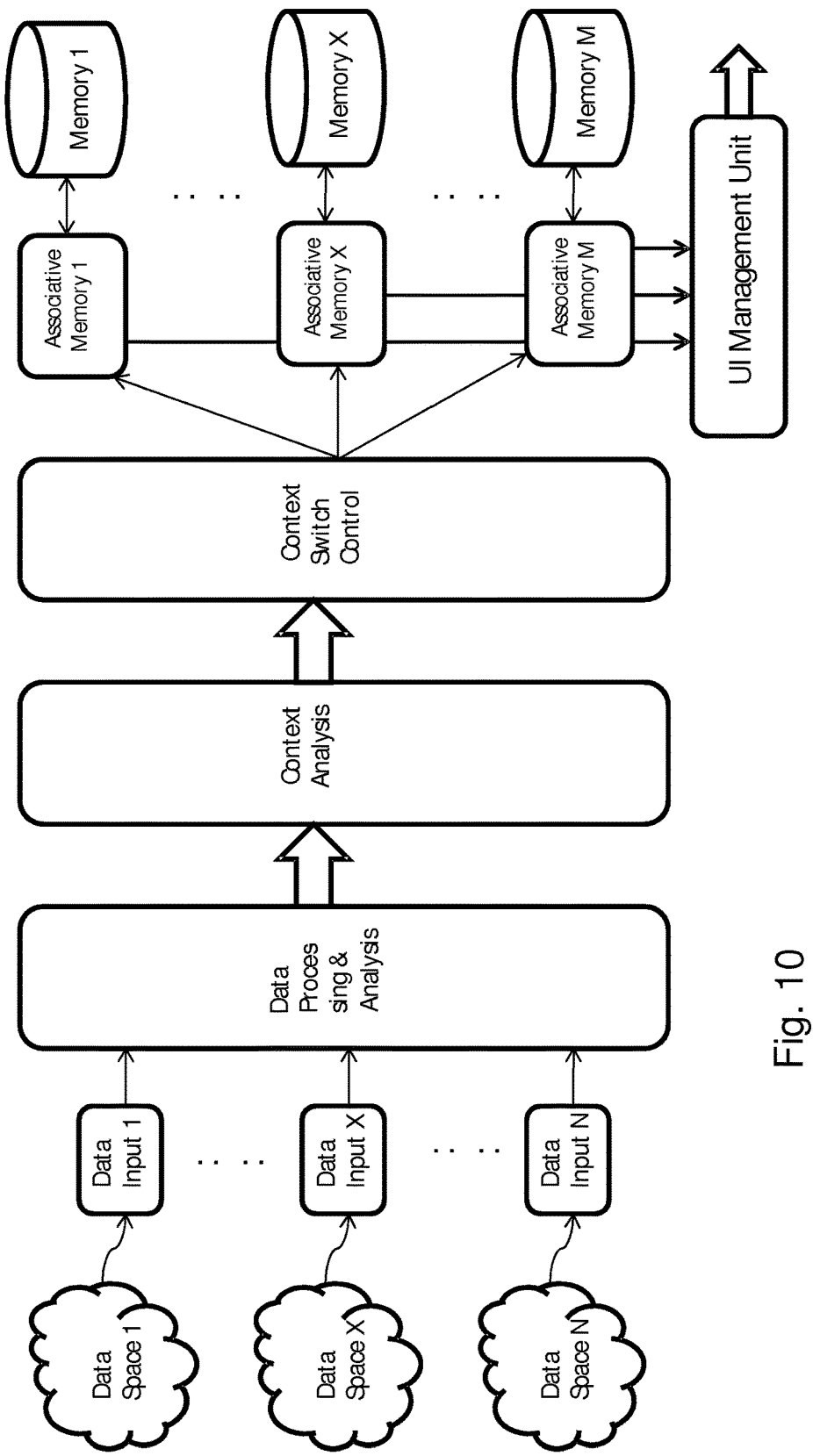
FIG. 10 illustrates an embodiment with a plurality of mappings between context vectors and resource availability vectors.

FIG. 10 illustrates an embodiment with a plurality of mappings between context vectors and resource availability vectors. Different situations, environments and such have different data spaces (Data Space 1, . . . , Data Space X, . . . Data Space N) of data vectors indicative of the context. These different data spaces produce data inputs 1, . . . , X, . . . , N for the system, descriptive of the current context. After processing this data, the context may be determined. A context may be understood here to mean a status of the environment, the user and the device in which the system is being used. For example, the context may be "in a meeting", "driving a car", "walking outside", "sitting at home", "at a party", "sleeping", "having dinner", "in a loud space", "in bright sunlight" etc. Based on the recognized or determined context, a corresponding or best matching associative memory may be chosen among a group of associative memories (Associative Memory 1, . . . , Associative Memory X, . . . , Associative Memory M). The associative memories, or the data structure residing therein, may have been formed e.g. by the methods described earlier in this application by training the associative memory in a specific context. The associative memories may also have been formed by processing a single associative memory. There may be related data storages 1, . . . X, . . . , M for the associative memories so that data may be loaded into and out from the associative memories. The output from a single (selected) associative memory may then be used in the UI management unit for adapting the user interface. Alternatively, a plurality of associative memories may be chosen, and a plurality of output vectors from the associative memories may be used for adapting the user interface. For example, the associative memories may be used in a competitive way by selecting the output from the associative memory based on the reliability of the output. The reliability may be determined as described earlier, that is, based on the sum vector values (S1, . . . , SN in FIG. 5b) or by some other means.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

It is obvious that the present invention is not limited solely to the above-presented embodiments, but it can be modified within the scope of the appended claims.

The invention claimed is:

1. A method comprising:
providing a data structure, implemented as a sparse distributed memory, comprising context vectors and resource availability vectors and having an association between said context vectors and said resource availability vectors, wherein the resource availability vectors are indicative of availability of user resources related to at least speech, audio, visual, or touch and comprise an array of elements corresponding to an available resource and elements corresponding to an unavailable resource,
receiving a context vector comprising context variables,
using said context vector to select a plurality of resource availability vectors, the plurality of resource availability vectors being indicative of availability of user resources related to at least speech, audio, visual, or touch,
modifying the selected resource availability vectors using a teaching resource availability vector associated with said context vector, wherein the teaching resource availability vector is based on information measured from a user's capabilities to use each of the user resources, wherein the user's capabilities to use each of the user resources is derived from training data comprising reaction time or correctness to a situation given at least one limitation on the user resources caused by the context variables; and
associating the context variables with the user's capabilities of using each of the user resources in a current situation.

2. A method according to claim 1, comprising
modifying said selected resource availability vectors by increasing a value of the elements corresponding to the available resource in said teaching resource availability vector.

3. A method according to claim 1, comprising
modifying said selected resource availability vectors by decreasing a value of the elements corresponding to the unavailable resource in said teaching resource availability vector.

4. A method according to claim 1, comprising
using a distance measure in said selecting, and
modifying said selected resource availability vectors according to said distance measure.

5. A method according to claim 1, comprising
thresholding said teaching resource availability vector, and
modifying said selected resource availability vectors using said thresholded teaching resource availability vector.

6. A method according to claim 1, wherein said resource availability vectors reside in an associative memory such as a sparse distributed memory, the method comprising
inputting said context vector as a single memory address input to said associative memory, and
selecting a plurality of data vectors from the associative memory based on said input address.

7. A method according to claim 1, wherein resource availability vectors have an associated context address, the method comprising:
carrying out said selection by comparing said context vector to said context addresses.

8. A method according to claim 1, wherein said context vector is indicative of an environmental variable such as temperature, time, location, altitude, acceleration, attitude, lighting, noise conditions and humidity.

9. A method according to claim 1, wherein said context vector is indicative of the state of the device such as an operating profile, availability of a keyboard, availability of a touch input device and power supply conditions.

10. A method according to claim 1, wherein elements of the resource availability vectors provide certainty information on the availability of user resources.

11. A method according to claim 1, wherein the context vector comprises bit representations indicative of a degree of availability of user resources.

12. A method comprising:
receiving a context vector comprising context variables,
using said context vector to select a plurality of resource availability vectors, the plurality of resource availability vectors being indicative of availability of user resources related to at least speech, audio, visual, or touch and comprising an array of elements corresponding to an available resource and elements corresponding to an unavailable resource,
associating the context variables with a user's capabilities of using each of the user resources in a current situation, wherein the user's capabilities of using each of the user resources is derived from training data comprising reaction time or correctness to a situation given at least one limitation on the user resources caused by the context variables, and
using said selected resource availability vectors together in adapting a user interface according to the availability of said user resources based on information measured from the user's capabilities.

13. A method according to claim 6, comprising
choosing said associative memory among a group of associative memories based on said received context vector, and
selecting said plurality of data vectors in said selected associative memory using said context vector.

14. A method according to claim 6, wherein the possible address space of context addresses comprises more entries than the total number of context addresses associated to availability vectors, and the addresses of the memory locations having been assigned to the resource availability vectors using a function.

15. A method according to claim 12, wherein said resource availability vectors having been formed by selecting former resource availability vectors as in claim 1, said method comprising modifying the selected resource availability vectors using a teaching resource availability vector associated with said context vector.

16. A method according to claim 12, comprising forming an adaptation vector from said selected resource availability vectors.

17. A computer program product stored on a non-transitory computer readable medium having executable computer program code instructions stored therein, the computer program code instructions configured for:

providing a data structure, implemented as a sparse distributed memory, comprising context vectors and resource availability vectors and an association between said context vectors and said resource availability vectors, using an input context vector comprising context variables to select a plurality of resource availability vectors from said data structure, the plurality of resource availability vectors being indicative of availability of user resources related to at least speech, audio, visual, or touch and comprising an array of elements corresponding to an available resource and elements corresponding to an unavailable resource, associating the context variables with a user's capabilities of using each of the user resources in a current situation, wherein the user's capabilities of using each of the user resources is derived from training data comprising reaction time or correctness to a situation given at least one limitation on the user resources caused by the context variables, and controlling operation of a device using said selected resource availability vectors together to adapt a user interface of the device according to the availability of said user resources based on information measured from the user's capabilities.

18. An apparatus comprising at least one processor, memory and computer program code in said memory, said computer program code being configured to, with the at least one processor, cause the apparatus at least to:

receive a context vector comprising context variables, use said context vector to select a plurality of resource availability vectors, the plurality of resource availability vectors being indicative of availability of user resources related to at least speech, audio, visual, or touch and comprising an array of elements corresponding to an available resource and elements corresponding to an unavailable resource, associate the context variables with a user's capabilities of using each of the user resources in a current situation, wherein the user's capabilities of using each of the user resources is derived from training data comprising reaction time or correctness to a situation given at least one limitation on the user resources caused by the context variables, and use said selected resource availability vectors together in adapting a user interface according to the availability of said user resources based on information measured from the user's capabilities or performance.

19. An apparatus according to claim 18, further comprising an associative memory such as a sparse distributed memory, resource availability vectors residing in said associative memory, and computer program code configured to cause the apparatus at least to:

input said context vector as a single memory address input to said associative memory, and select a plurality of data vectors from the memory base on said input address.

20. An apparatus according to claim 18, further comprising means for producing said context vector.

21. An apparatus according to claim 18 comprising different user interface modalities, and means for enabling and disabling said user interface modalities based on said availability of user resources.

* * * * *